(12) United States Patent
Kang

(10) Patent No.: US 9,828,275 B2
(45) Date of Patent: Nov. 28, 2017

(54) METHOD AND HEAT EXCHANGE SYSTEM UTILIZING VARIABLE PARTIAL BYPASS

(71) Applicant: American Air Liquide, Inc., Fremont, CA (US)

(72) Inventor: Taekyu Kang, Newark, DE (US)

(73) Assignee: American Air Liquide, Inc., Fremont, CA (US)

( * ) Notice: Subject to any disclaimer, the term of this patent is extended or adjusted under 35 U.S.C. 154(b) by 711 days.

(21) Appl. No.: 13/955,923

(22) Filed: Jul. 31, 2013

(65) Prior Publication Data

US 2015/0004552 A1 Jan. 1, 2015

Related U.S. Application Data

(60) Provisional application No. 61/841,252, filed on Jun. 28, 2013.

(51) Int. Cl.
| | | |
|---|---|---|
| C03B 5/235 | (2006.01) | |
| F28F 27/00 | (2006.01) | |
| C03B 5/237 | (2006.01) | |
| F23L 15/04 | (2006.01) | |
| F28F 27/02 | (2006.01) | |
| F28D 7/16 | (2006.01) | |
| F28D 21/00 | (2006.01) | |

(52) U.S. Cl.
CPC ............ *C03B 5/2353* (2013.01); *C03B 5/237* (2013.01); *F23L 15/04* (2013.01); *F28D 7/16* (2013.01); *F28D 21/001* (2013.01); *F28F 27/00* (2013.01); *F28F 27/02* (2013.01); *C03B 2211/40* (2013.01); *F28F 2250/06* (2013.01); *F28F 2265/10* (2013.01); *Y02E 20/348* (2013.01); *Y02P 40/535* (2015.11); *Y02P 40/55* (2015.11)

(58) Field of Classification Search
CPC ... C03B 2211/40; C03B 5/2353; C03B 5/237; F28F 2250/06; F28F 2265/10
See application file for complete search history.

(56) References Cited

U.S. PATENT DOCUMENTS

| | | | |
|---|---|---|---|
| 2,498,637 A | * | 2/1950 | Bay ........................... F01P 3/20 165/141 |
| 4,593,757 A | | 6/1986 | McClintock |
| 4,991,643 A | | 2/1991 | Price et al. |
| 5,615,738 A | | 4/1997 | Cameron et al. |
| 5,807,418 A | | 9/1998 | Chamberland et al. |
| 6,003,954 A | | 12/1999 | Everhard et al. |
| 6,250,916 B1 | | 6/2001 | Philippe et al. |

(Continued)

FOREIGN PATENT DOCUMENTS

| | | | | |
|---|---|---|---|---|
| CH | FR 2475707 A1 | * | 8/1981 | ......... F28D 21/0007 |
| CH | DE 4430648 A1 | * | 3/1996 | ......... F25D 21/0003 |

(Continued)

OTHER PUBLICATIONS

International Search Report and Written Opinion for PCT/US2014/044488, dated Oct. 8, 2014.

*Primary Examiner* — Steven B McAllister
*Assistant Examiner* — Steven Anderson, III
(74) *Attorney, Agent, or Firm* — Christopher J. Cronin

(57) ABSTRACT

Temperature overshoot of internal components of a counter-flow shell and tube heat heat exchange may be reduced or avoided by adjusting the degree to which a tube-side fluid partially bypasses the heat exchanger.

10 Claims, 10 Drawing Sheets

(56) References Cited

U.S. PATENT DOCUMENTS

| | | | |
|---|---|---|---|
| 6,302,191 B1 | 10/2001 | Wickham et al. | |
| 6,910,879 B2 | 6/2005 | Dugue et al. | |
| 7,234,512 B2 | 6/2007 | Anderson | |
| 7,487,826 B2* | 2/2009 | Pineo et al. | F01M 5/00 165/103 |
| 2003/0209344 A1* | 11/2003 | Fang | F28D 1/0443 165/140 |
| 2005/0133202 A1* | 6/2005 | Jorgensen | F28D 7/024 165/103 |
| 2006/0032613 A1* | 2/2006 | Brost | F02M 25/0703 165/103 |
| 2007/0172781 A1 | 7/2007 | Tsiava et al. | |
| 2007/0281254 A1 | 12/2007 | Leroux et al. | |
| 2009/0029800 A1 | 1/2009 | Jones et al. | |
| 2009/0084140 A1 | 4/2009 | Kobayashi | |
| 2009/0320642 A1 | 12/2009 | Führer et al. | |
| 2010/0258263 A1* | 10/2010 | Douxchamps | F28D 7/16 165/11.1 |
| 2010/0282440 A1* | 11/2010 | Trihey et al. | F24D 3/08 165/104.19 |
| 2011/0104625 A1* | 5/2011 | Amirat | C03B 5/2353 431/190 |
| 2011/0104628 A1 | 5/2011 | Douxchamps et al. | |
| 2011/0131961 A1* | 6/2011 | Lee | F01M 5/001 60/320 |
| 2011/0259574 A1* | 10/2011 | Angel et al. | F23L 15/04 165/287 |
| 2013/0048258 A1* | 2/2013 | Yang | F28F 9/0273 165/162 |

FOREIGN PATENT DOCUMENTS

| | | |
|---|---|---|
| DE | 41 23 243 | 1/1993 |
| EP | 0 356 648 | 3/1990 |

* cited by examiner

METHOD AND HEAT EXCHANGE SYSTEM UTILIZING VARIABLE PARTIAL BYPASS

CROSS-REFERENCE TO RELATED APPLICATIONS

This patent application claims the benefit of U.S. Provisional Patent Application No. 61/841,252 filed Jun. 28, 2013.

BACKGROUND

In processes which rely on delivery of large amounts of heat energy into a furnace by combustion of a fuel, it is particularly important to achieve as high an energy-efficiency as possible. Thus it is a common practice to recover excess heat in the flue-gas, for example by using it to heat combustion air. Another way to improve efficiency is by oxy-combustion, which, by replacing air ordinarily used in combustion with a stream that is largely oxygen, avoids heating the nitrogen component of air. While heat lost to the flue gas is reduced in oxy-combustion (because the flue-gas volume is less), the amount of heat lost is still substantial, and it would be advantageous to recover that heat.

U.S. Pat. No. 5,807,418 discloses heat recovery by "co-current indirect heat exchange" of an oxidant (at least 50% $O_2$) by the flue-gas, followed by using the partially-cooled flue-gas to pre-heat batch and/or cullet. As used by U.S. Pat. No. 5,807,418, "co-current indirect heat exchange" refers simply to a heat exchanger in which the oxidant and heat exchanger are separated by a wall, with both the oxidant and the flue gas flowing in the same direction. While a sketch is provided, details such as materials of construction of the heat exchanger are not, but for the comment that the heat exchanger is "constructed using materials and in a way that renders it compatible with and safe for handling oxygen-rich oxidants and high temperatures". Considering the practical difficulty of constructing such a heat exchanger, this instruction is not sufficient to allow practical implementation by the skilled artisan. This scheme suffers from the apparent disadvantage that unburnt fuel in the hot combustion gases may come into contact with oxygen, either from a leak or at a regenerator, thereby posing an unacceptably high risk of catastrophic uncontrolled combustion.

US 2009/0084140 uses a scheme similar to U.S. Pat. No. 5,807,418, but with batch/cullet pre-heat in parallel with oxidant pre-heat, and with additional disclosure related to the batch/cullet heat exchanger. Again, no details on the construction of the oxidant heat exchanger are disclosed other than to say that it may be a regenerative or recuperative heat exchanger. A single stream of oxidant is sent to a heat exchanger where it is heated through heat exchange with hot combustion gases. Three streams of fuel along with three streams of pre-heated oxidant from the heat exchanger are combusted by three corresponding burners. Thus, in each case, a single stream of oxidant is sent to each heat exchanger. There is no mention of controlling the temperature of internal components of the heat exchanger. This approach, too, suffers from the disadvantage that unburnt fuel in the hot combustion gases may come into contact with oxygen, either from a leak or at a regenerator, thereby posing an unacceptably high risk of catastrophic uncontrolled combustion.

US 2009/029800 discloses a heat exchanger in which heat is exchanged between flue gases and either an oxidant or a fuel through an intermediate inert gas. Thus, a wall separates the flue gases from the inert gas and another wall separates the inert gas from the oxidant or fuel. While this reduces the chances that catastrophic uncontrolled combustion may occur, this type of heat exchanger is relatively more complicated to construct and maintain. In each case, a single stream of oxidant is sent to each heat exchanger. Additionally, there is no mention of controlling the temperature of internal components of the heat exchanger other than to say that the intermediate gas acts as a thermal buffer to dampen variations in temperature of the oxidant or fuel.

US 2010/0258263 discloses pre-heating oxidant for a furnace where, instead of using one large heat exchanger for pre-heating many oxidant streams, it proposes the use of several, smaller-dimensioned heat exchangers for a relatively small number of burners. There is no mention of controlling the temperature of internal components of the heat exchanger.

US 2011/0104625 discloses pre-heating oxidant for a furnace where a heat transfer fluid is first pre-heated through recuperative heat exchange with hot flue gases followed by pre-heating of the oxidant through heat exchange with the hot heat transfer fluid at an additional heat exchanger. In each case, a single stream of oxidant is sent to each heat exchanger. There is no mention of controlling the temperature of internal components of the heat exchanger.

US 2011/0104628 similarly discloses pre-heating oxidant for a furnace where a heat transfer fluid is first pre-heated through recuperative heat exchange with hot flue gases followed by pre-heating of the oxidant through heat exchange with the hot heat transfer fluid at an additional heat exchanger. Again, in each case a single stream of oxidant is sent to each heat exchanger. It specifically discloses that the number of heat exchangers in relation to the number of burners should be increased so that the lengths of the hot oxidant lines from the heat exchanger to the burners can be minimized to avoid thermal losses. There is no mention of controlling the temperature of internal components of the heat exchanger.

U.S. Pat. No. 6,250,916 also discloses pre-heating oxidant for a furnace where a heat transfer fluid is first pre-heated through recuperative heat exchange with hot flue gases followed by pre-heating of the oxidant through heat exchange with the hot heat transfer fluid at an additional heat exchanger. Again, in each case a single stream of oxidant is sent to each heat exchanger. There is no mention of controlling the temperature of internal components of the heat exchanger.

Many have proposed designs for performing heat exchange with a shell and tube heat exchangers where the temperature of either the tube or or shell side fluid is managed using a bypass for bypassing an amount of the fluid past the heat exchanger (i.e., U.S. Pat. Nos. 7,234,512; 4,593,757, 6,003,954; 5,615,738; and 4,991,643; US 2009/0320642; U.S. Pat. Nos. 6,302,191; 6,003,594, and5,615, 738). The basic concept of these designs is illustrated in FIG. 1 where a feed flow of a tube-side fluid is divided between a main flow and a bypass flow. The main flow is heated or cooled by the shell-side fluid inside the heat exchanger HE while the bypass flow completely bypasses it. After bypass, each of the fluid flows are combined. The temperature of the combined flow is measured. In the case of a tube-side fluid being heated by a shell-side fluid, if the temperature is higher than a predetermined setpoint, a controller sends a signal to a control valve commanding it to increase the amount of the tube-side fluid that bypasses the heat exchanger. In this manner, the temperature of the combined flow may be managed to some degree. Shell side bypass can be achieved using external valves or mechanically manipulating baffles (i.e., U.S. Pat. No. 6,003,594 and U.S. Pat. No. 5,615,738)—the latter seems complex to be constructed. Other proposals (US 2009/0320642, U.S. Pat. No. 4,991,643) show methods of tube side internal bypass but they require sophisticated valves.

There have been some other proposals for shell side internal bypass, but in each of those cases, the purpose of the bypass is to improve the efficiency with better flow distribution, not for control of temperature.

The proposal illustrated in FIG. 1 does provide some advantages. Controlling the temperature of the combined flows is important, because a relatively constant process gas temperature can be achieved. Also, the temperature of the process gas can be controlled to a degree that the temperature of any process gas conveying pipes located downstream of the heat exchanger can be maintained below their material limit. For example, in the case of an oxidative process gas the downstream pipes must be kept below the material limit of those pipes in order to avoid premature or catastrophic failure of those pipes.

However, the complete bypass technique illustrated in FIG. 1 is also associated with some disadvantages. There can be a temperature overshoot inside the heat exchanger when the amount of bypass is too large. This is because when the flow rate of the bypass is increased, the flow rate of the tube-side fluid flowing through the heat exchanger is correspondingly decreased. A decreased flow rate of the tube-side fluid inside the heat exchanger will increase the heat exchange rate between the tube-side fluid and the hot shell-side fluid. As a result, although the setpoint temperature of the combined flows might not be exceeded downstream of the heat exchanger, the temperature inside the heat exchanger may reach unsatisfactorily high levels. When the tube-side fluid is reactive or oxidative, such as oxygen or oxygen-enriched air, unsatisfactorily high temperatures can cause corrosion and/or uncontrolled combustion inside the heat exchanger. This poses an unacceptably high risk of premature or catastrophic failure. This high risk is exacerbated when the reactive oxidative tube-side fluid follows a flow path having bends/turns that introduce localized high turbulence. Highly turbulent flow increases the rate at which the tube-side fluid reacts with or oxidizes the tube-side portion of the heat exchanger adjacent the highly turbulent flow.

For this reason, the solution illustrated in FIG. 1 must be operated well below the actual limit temperature at which the internal components of the heat exchanger may fail. For instance, if the maximum internal temperature ever reached within the heat exchanger is only 500° C. (which is lower than the limit temperature of 580° C.) perhaps as much as 20-30% bypass of the tube-side fluid can be achieved without fear of reaching the limit temperature 580° C. The necessity of having to operate the heat exchanger at a temperature well below the material limit temperature of the heat exchanger internal components can significantly constrain the range of safely achievable tube-side gas temperatures. In order to reach higher tube-side temperatures, the heat exchanger must be manufactured from exotic and high expensive materials.

Thus, there is a need for a method and heat exchange system that does not exhibit an unacceptably high risk of premature and potential catastrophic failure. There is also a need for a method and heat exchange system that reduces the number of heat exchangers in relation to the number of burners receiving pre-heated oxidant or fuel from the heat exchangers. There is also a need for a method and heat exchange system that controls the temperature of internal components of a heat exchanger without incurring temperature overshoots. There is also a need for a method and heat exchange system that may safely achieve a relatively wider range of process gas temperatures at a reasonable cost. There is still also a need for a method and heat exchange system that may safely achieve a relatively wider range of process gas temperatures while still allowing the heat exchanger to be manufactured with a wide variety of materials.

SUMMARY

The invention is provided for satisfying the above needs.

There is provided a method for reducing overheating of internal components of a counter-flow shell and tube heat exchanger utilizing variable partial bypass of a reactant flow. The method includes the following steps. A first feed flow ($FF_1$) of a cool reactant is divided with a first control valve ($CV_1$) between a first main flow ($MF_1$) of the cool reactant and a first bypass flow ($BF_1$) of the cool reactant, the first main flow ($MF_1$) flowing through a counter-flow shell and tube heat exchanger on a tube-side of the heat exchanger. Heat is exchanged at the shell and tube heat exchanger between the first main flow ($MF_1$) and a flow of a hot shell-side fluid and combining the first main flow ($MF_1$) with the first bypass flow ($BF_1$) to produce a first combined flow ($CF_1$) of heated reactant and also a flow of cooled shell-side fluid, the first combined flow ($CF_1$) exiting the heat exchanger at a first reactant outlet ($RO_1$) of the heat exchanger. A temperature of the first combined flow ($CF_1$) is measured at or downstream of the first reactant outlet ($RO_1$). Relative proportions of the first main flow ($MF_1$) and first bypass flow ($BF_1$), resulting from division of the first feed flow ($FF_1$), are controlled with the control valve ($CV_1$) based upon the measured temperature of the first combined flow ($CF_1$), wherein less heat is transferred from the shell-side fluid to the first bypass flow ($BF_1$) than is transferred from the shell-side fluid to the first main flow ($MF_1$).

There is also provided an improved counter-flow shell and tube heat exchange system for reduction of overheating of internal components thereof utilizing variable partial bypass of a reactant flow, said heat exchange system comprising: a first control valve ($CV_1$) adapted and configured to divide a first feed flow ($FF_1$) of cool reactant into a first main flow ($MF_1$) of the cool reactant and a first bypass flow ($BF_1$) of the cool reactant; a first main flow inlet conduit (27, 67, 106) receiving the first main flow ($MF_1$) of cool reactant from the first control valve ($CV_1$); a first bypass flow inlet conduit (26, 66, 107) receiving the first bypass flow ($BF_1$) of cool reactant from the first control valve ($CV_1$); a shell (35) having a shell-side fluid inlet and outlet (SI, SO) fluidly communicating with an interior of the shell (35) comprising a heat exchange space; means for exchanging heat between the first main flow ($MF_1$) and a flow of a hot shell-side fluid in the heat exchange space; means for exchanging heat between the first bypass flow ($BF_1$) and the flow of hot shell-side fluid in the heat exchange space, wherein said means for exchanging heat between the first main flow ($MF_1$) and the flow of the hot shell-side fluid is configured and adapted to allow more heat to be exchanged between the first main flow ($MF_1$) and the flow of hot shell-side fluid than is exchanged between the first bypass flow ($BF_1$) and the flow of hot shell-side fluid by the means for exchanging heat between the first bypass flow ($BF_1$) and the flow of hot shell-side fluid; means for combining the first main flow ($MF_1$) with the first bypass flow ($BF_1$) to produce a first combined flow ($CF_1$) of heated reactant; at least one first downstream reactant tube (92, 112) receiving the first combined flow ($CF_1$) and fluidly communicating with a first reactant outlet ($RO_1$); a first outlet conduit fluidly communicating with the first reactant outlet ($RO_1$) and receiving the first combined flow ($CF_1$) therefrom; a first temperature sensor ($T_1$) disposed in the outlet conduit at or downstream of the first reactant outlet ($RO_1$); and a programmable logic controller (C) adapted and configured to control relative proportions of the first main flow ($MF_1$) and first bypass flow ($BF_1$) produced by division of the first feed flow ($FF_1$) of cool reactant by the first control valve ($CV_1$), said control being based upon a temperature of the first combined flow ($CF_1$) sensed by the first temperature sensor ($T_1$).

There is also provided a glass furnace utilizing preheated reactant or reactants, comprising first and second burners ($23_A$, $23_B$) disposed on a wall (22) of a furnace enclosing a combustion space adapted and configured to contain a glassmaking charge or molten glass, a source of gaseous fuel ($19_A$, $19_B$), a source of oxidant ($11_A$, $11_B$) selected from the group consisting of industrially pure oxygen and oxygen-enriched air, and a recuperator or regenerator (5) having an outlet (6), and the heat exchange system of claim 18. The first and second cool reactants are a same cool oxidant received from said source of oxidant ($11_A$, $11_B$). The burners ($23_A$, $23_B$) receive the gaseous fuel from said source of gaseous fuel ($19_A$, $19_B$). The first control valve ($CV_1$) receives the first feed flow ($FF_1$) of cool reactant from the source of oxidant ($11_A$). The second control valve ($CV_2$) receives the second feed flow ($FF_1$) of cool reactant from the source of oxidant ($11_B$). The hot shell-side fluid is air received from the outlet (6) of the recuperator or regenerator (5). The first and second combined flows ($CF_1$, $CF_2$) are combusted with the gaseous fuel at the first and second burners ($23_A$, $23_B$), respectively for producing heat to heat the charge or molten glass.

There is provided another glass furnace utilizing preheated reactant or reactants, comprising first and second burners ($23_A$, $23_B$) disposed on a wall (22) of a furnace enclosing a combustion space adapted and configured to contain a glassmaking charge or molten glass, a source of gaseous fuel ($19_A$, $19_B$), a source of oxidant ($11_A$, $11_B$) selected from the group consisting of industrially pure oxygen and oxygen-enriched air, and a recuperator or regenerator (5) having an outlet (6), and the heat exchange system of claim 18. The first and second cool reactants are a same gaseous fuel received from said source of gaseous fuel ($19_A$, $19_B$). The burners ($23_A$, $23_B$) receive the oxidant from said source of oxidant ($11_A$, $11_B$). The first control valve ($CV_1$) receives the first feed flow ($FF_1$) of cool reactant from the source of gaseous fuel ($19_A$). The second control valve receives the second feed flow of cool reactant from the source of gaseous fuel ($19_B$). The hot shell-side fluid is air received from the outlet (6) of the recuperator or regenerator (5). The first and second combined flows ($CF_1$, $CF_2$) are combusted with the oxidant at the first and second burners ($23_A$, $23_B$), respectively for producing heat to heat the charge or molten glass.

There is provided yet another glass furnace utilizing preheated reactant or reactants, comprising first and second burners disposed on a wall of a furnace enclosing a combustion space adapted and configured to contain a glassmaking charge or molten glass, a source of gaseous fuel ($19_A$, $19_B$), a source of oxidant ($11_A$, $11_B$) selected from the group consisting of industrially pure oxygen and oxygen-enriched air, and a recuperator or regenerator (5) having an outlet (6), and two of the heat exchange systems of claim 18. The first and second cool reactants of a first of the two heat exchange systems are a same gaseous fuel received from said source of gaseous fuel ($19_A$, $19_B$). The first and second cool reactants of a second of the two heat exchange systems are a same oxidant received from said source of oxidant ($11_A$, $11_B$). The first control valve ($CV_1$) of the first of the two heat exchange systems receives the first feed flow ($FF_1$) of cool reactant from the source of oxidant ($11_A$). The second control valve ($CV_2$) of the first of the two heat exchange systems receives the second feed flow ($FF_2$) of cool reactant from the source of oxidant ($11_B$). The first control valve ($CV_1$) of the second of the two heat exchange systems receives the first feed flow ($FF_1$) of cool reactant from the source of gaseous fuel ($19_A$). The second control valve ($CV_2$) of the second of the two heat exchange systems receives the second feed flow ($FF_2$) of cool reactant from the source of gaseous fuel ($19_B$). The hot shell-side fluid is air received from the outlet (6) of the recuperator or regenerator (5). The first combined flow ($CF_1$) from the first of the two heat exchange systems and the first combined flow ($CF_1$) from the second of the two heat exchange systems are combusted at the first burner ($23_A$) for producing heat to heat the charge or molten glass. The second combined flow ($CF_2$) from the first of the two heat exchange systems and the second combined flow ($CF_2$) from the second of the two heat exchange systems are combusted at the second burner ($23_B$) for producing heat to heat the charge or molten glass.

Any one or more of the heat exchange system, method, or glass furnaces may include one or more of the following aspects:

A second feed flow ($FF_2$) of a cool reactant is divided with a second control valve ($CV_2$) between a second main flow ($MF_2$) of the cool reactant and a second bypass flow ($BF_2$) of the cool reactant, the second main flow ($MF_2$) flowing through a shell and tube heat exchanger on the tube-side. Heat is exchanged at the shell and tube heat exchanger between the second main flow ($MF_2$) and a flow of a hot shell-side fluid and combining the second main flow ($MF_2$) with the second bypass flow ($BF_2$) to produce a second combined flow ($CF_2$) of heated reactant and the flow of cooled shell-side fluid, the second combined flow ($CF_2$) exiting the heat exchanger at a second reactant outlet ($RO_2$) of the heat exchanger. A temperature of the second combined flow ($CF_2$) is measured at or downstream of the second reactant outlet ($RO_2$). Relative proportions of the second main flow ($MF_2$) and second bypass flow ($BF_2$), resulting from division of the second feed flow ($FF_2$), are controlled with the second control valve ($CV_2$) based upon the measured temperature of the second combined flow ($CF_2$). Less heat is transferred from the shell-side fluid to the second bypass flow ($BF_2$) than is transferred from the shell-side fluid to the second main flow ($MF_2$). Control of the relative proportions of the first feed flow ($FF_1$) into the first main and bypass flows ($MF_1$, $BF_1$) is independent of control of the relative proportions of the second feed flow ($FF_2$) into the second main and bypass flows ($MF_2$, $BF_2$).

the reactant is an oxidant having an oxygen concentration higher than that of air.

the reactant is industrially pure oxygen.

the reactant is oxygen-enriched air.

the reactant is a gaseous fuel.

the shell-side fluid is air or an inert gas.

the shell and tube heat exchanger includes: a first bypass inlet plenum (28) receiving the first bypass flow ($BF_1$), the first bypass inlet plenum (28) terminating in a downstream direction at a first tubesheet (30); a first set of bypass tubes (33) fluidly communicating with the first bypass inlet plenum (28), extending downstream from the first tubesheet (30), and terminating at open downstream ends (34); a first main inlet plenum (29) receiving the first main flow ($MF_1$), the first main inlet plenum (29) terminating in a downstream direction at a second tubesheet (31), the first main inlet plenum (29) surrounding the first set of bypass tubes (33) in sealing fashion in between the first and second tubesheets (30, 31); and a first set of main tubes (32) each one of which communicates with the first main inlet plenum (29), extends downstream of the second tubesheet (31), and concentrically surrounds a respective one of the first set of bypass tubes (33). Each of the main tubes (32) in the first set of main tubes fluidly communicates with the first reactant outlet ($RO_1$). At each open downstream end (34) of one of the bypass tubes (33) of the first set of bypass tubes (33) a portion of the first main flow ($MF_1$) combines with a respective portion of the first bypass flow ($BF_1$) to form a portion of the first combined flow ($CF_1$) which flows along a remaining downstream portion of the respective main tube (32) to the first reactant outlet ($RO_1$). Heat exchange between the first bypass flow ($BF_1$) and the hot shell-side fluid is achieved via the first main flow ($MF_1$) flowing in annular spaces in between the first set of main tubes (32) and the first set of bypass tubes (33).

the shell and tube heat exchanger includes: a first bypass inlet plenum (28) receiving the first bypass flow ($BF_1$), the first bypass inlet plenum (28) terminating in a downstream direction at a first tubesheet (30); a first set of bypass tubes (33) fluidly communicating with the first bypass inlet plenum (28), extending downstream from the first tubesheet (30), and terminating at open downstream ends (34); a first main inlet plenum (29) receiving the first main flow ($MF_1$), the first main inlet plenum (29) terminating in a downstream direction at a second tubesheet (31), the first main inlet plenum (29) surrounding the first set of bypass tubes (33) in sealing fashion in between the first and second tubesheets (30, 31); a first set of main tubes (32) each one of which communicates with the first main inlet plenum (29), extends downstream of the second tubesheet (31), and concentrically surrounds a respective one of the first set of bypass tubes (33), each of the main tubes (32) in the first set of main tubes fluidly communicating with the first reactant outlet ($RO_1$), at each open downstream end (34) of one of the bypass tubes (33) of the first set of bypass tubes (33) a portion of the first main flow ($MF_1$) combines with a respective portion of the first bypass flow ($BF_1$) to form a portion of the first combined flow ($CF_1$) which flows along a remaining downstream portion of the respective main tube (32) to the first reactant outlet ($RO_1$), heat exchange between the first bypass flow ($BF_1$) and the hot shell-side fluid being achieved via the first main flow ($MF_1$) flowing in annular spaces in between the first set of main tubes (32) and the first set of bypass tubes (33); a second bypass inlet plenum (48) receiving the second bypass flow ($BF_2$), the second bypass inlet plenum (48) terminating in a downstream direction at a fourth tubesheet (50), the fourth tubesheet (50) extending in a same plane with the first tubesheet (31); a second set of bypass tubes (53) fluidly communicating with the second bypass inlet plenum (48), extending downstream from the fourth tubesheet (31), and terminating at open downstream ends (54); a second main inlet plenum (49) receiving the second main flow ($MF_1$), the second main inlet plenum (49) terminating in a downstream direction at the second tubesheet (31), the second main inlet plenum (49) surrounding the second set of bypass tubes (53) in sealing fashion in between the fourth and second tubesheets (50, 31); and a second set of main tubes (52) each one of which communicates with the second main inlet plenum (49), extends downstream of the second tubesheet (31), and concentrically surrounds a respective one of the second set of bypass tubes (53). Each of the main tubes (52) in the second set of main tubes (52) fluidly communicates with a second reactant outlet ($RO_2$). At each open downstream end (54) of one of the bypass tubes (53) of the second set of bypass tubes (53) a portion of the second main flow ($MF_2$) combines with a respective portion of the second bypass flow ($BF_2$) to form a portion of the second combined flow ($CF_1$) which flows along a remaining downstream portion of the respective main tube (52) to the second reactant outlet ($RO_1$).

the shell and tube heat exchanger includes: a first inlet plenum (69) receiving the first bypass flow ($BF_1$), the first inlet plenum (69) disposed inside the shell (35); a first outlet plenum (114, 113) fluidly communicating with the first reactant outlet ($RO_1$); at least one first reactant tube (71) fluidly communicating between the first inlet plenum (69) and the first outlet plenum (114, 113); and at least one first main flow tube (68) receiving the first main flow ($MF_1$) from the first control valve ($CV_1$), extending into an interior of the heat exchanger downstream of the first inlet plenum (89) and extending back to terminate at the first inlet plenum (89), wherein the first main flow ($MF_1$) is combined with the first bypass flow ($BF_1$) at the first inlet plenum (69) and the first combined flow ($CF_1$) flows through the at least one first reactant tube (71).

the shell and tube heat exchanger includes: a first inlet plenum (69) receiving the first bypass flow ($BF_1$), the first inlet plenum (69) disposed inside the shell (35); a first outlet plenum (114, 113) fluidly communicating with the first reactant outlet ($RO_1$); at least one first reactant tube (71) fluidly communicating between the first inlet plenum (69) and the first outlet plenum (114, 113); at least one first main flow tube (68) receiving the first main flow ($MF_1$) from the first control valve ($CV_1$), extending into an interior of the heat exchanger downstream of the first inlet plenum (69) and extending back to terminate at the first inlet plenum (69), wherein the first main flow ($MF_1$) is combined with the first bypass flow ($BF_1$) at the first inlet plenum (69) and the first combined flow ($CF_1$) flows through the at least one first reactant tube (71); a second inlet plenum (89) receiving the second bypass flow ($BF_2$), the second inlet plenum (89) disposed inside the shell (35); a second outlet plenum (115, 113) fluidly communicating with the second reactant outlet ($RO_2$); at least one second reactant tube (91) fluidly communicating between the second inlet plenum (89) and the second outlet plenum (115, 113); and at least one second main flow tube (88) receiving the second main flow ($MF_2$) from the second control valve ($CV_2$), extending into an interior of the heat exchanger downstream of the second inlet plenum (89) and extending back to terminate at the second inlet plenum (89), wherein the second main flow ($MF_2$) is combined with the second bypass flow ($BF_2$) at the second inlet plenum (89) and the second combined flow ($CF_2$) flows through the at least one second reactant tube (91).

the heat exchanger includes: first, second and third plenums (109, 111, 113), the third plenum (113) receiving the first combined flow ($CF_1$) and fluidly communicating with the first reactant outlet ($RO_1$); at least one first upstream reactant tube (110) receiving the first main flow ($MF_1$) and extending through an interior of the shell (35) from the first plenum (109) and fluidly communicating with the second plenum (111); a first bypass tube (107) receiving the first bypass flow ($BF_1$) and extending between the first control valve ($CV_1$) and the second plenum (111) and extending at least partially outside the shell of the heat exchanger, wherein the first main flow ($MF_1$) and the first bypass flow ($BF_1$) are combined at the second plenum (111); and at least one first downstream reactant tube (112) receiving the first combined flow ($CF_1$) and extending between the second and third plenums (111, 113).

the shell and tube heat exchanger includes: first, second and third plenums (109, 111, 113), the third plenum (113) receiving the first combined flow ($CF_1$) and fluidly communicating with the first reactant outlet ($RO_1$); at least one first upstream reactant tube (110) receiving the first main flow ($MF_1$) and extending through an interior of the shell (35) from the first plenum (109) and fluidly communicating with the second plenum (111); a first bypass tube (107) receiving the first bypass flow ($BF_1$) and extending between the first control valve ($CV_1$) and the second plenum (111) and extending at least partially outside the shell of the heat exchanger, wherein the first main flow ($MF_1$) and the first bypass flow ($BF_1$) are combined at the second plenum (111); at least one first downstream reactant tube (112) receiving the first combined flow ($CF_1$) and extending between the second and third plenums (111, 113); fourth, fifth and sixth plenums (109, 111, 113), the fourth plenum (113) receiving the second combined flow ($CF_2$) and fluidly communicating with the second reactant outlet ($RO_2$); at least one second upstream reactant tube (110) receiving the second main flow ($MF_2$) and extending inside the shell (35) from the fourth plenum (109) and fluidly communicating with the fifth plenum (111); a second bypass tube (107) receiving the second bypass flow ($BF_2$) and extending between the second control valve ($CV_2$) and the fifth plenum (111) and extending at least partially outside the shell (35) of the heat exchanger, wherein the second main flow ($MF_2$) and the second bypass flow ($BF_2$) are combined at the fifth plenum (111); and at least one second downstream reactant tube (112) receiving the second combined flow ($CF_2$) and extending between the fifth and sixth plenums (111, 113).

the hot shell-side fluid is obtained from a recuperator or regenerator.

the cooled shell-side fluid is directed to a recuperator or regenerator to heat the cooled shell-side fluid in order to produce the hot shell-side fluid.

the first combined flow ($cF_1$) exiting the first and second reactant outlets ($RO_1$, $RO_2$) is directed to first and second burners ($23_A$, $23_B$) operatively associated with a furnace, wherein: the shell-side fluid is air; the first and second reactants are the same and are selected from the group consisting of industrially pure oxygen, oxygen-enriched air, and natural gas; if the first and second reactants are industrially pure oxygen or oxygen-enriched air, the first and second reactants of the first and second combined flows ($CF_1$, $CF_2$) are combusted with fuel at the first and second burners ($23_A$, $23_B$); if the first and second reactants are natural gas, the first and second reactants of the first and second combined flows ($23_A$, $23_B$) are combusted with an oxidant at the first and second burners ($23_A$, $23_B$); and the furnace is a glass melting furnace.

the heat exchange system further comprises: a second control valve ($CV_2$) adapted and configured to divide a second feed flow ($FF_2$) of cool reactant into a second main flow ($MF_2$) of the cool reactant and a second bypass flow ($BF_2$) of the cool reactant; a second main flow inlet conduit (47, 87, 106) receiving the second main flow ($MF_2$) of cool reactant from the second control valve ($CV_2$); a second bypass flow inlet conduit (46, 46, 107) receiving the second bypass flow ($BF_2$) of cool reactant from the second control valve ($CV_2$); means for exchanging heat between the second main flow ($MF_2$) and a flow of the hot shell-side fluid in the heat exchange space; means for exchanging heat between the second bypass flow ($BF_2$) and the flow of hot shell-side fluid in the heat exchange space, wherein said means for exchanging heat between the second main flow ($MF_2$) and the flow of the hot shell-side fluid is configured and adapted to allow more heat to be exchanged between the second main flow ($MF_2$) and the flow of hot shell-side fluid than is exchanged between the second bypass flow ($BF_2$) and the flow of hot shell-side fluid by the means for exchanging heat between the second bypass flow ($BF_2$) and the flow of hot shell-side fluid; means for combining the second main flow ($MF_2$) with the first bypass flow ($BF_2$) to produce a second combined flow ($CF_2$) of heated reactant; at least one second downstream reactant tube (92, 112) receiving the second combined flow ($CF_2$) and fluidly communicating with a second reactant outlet ($RO_2$); a second outlet conduit fluidly communicating with the second reactant outlet ($RO_2$) and receiving the second combined flow ($CF_2$) therefrom; and a second temperature sensor ($T_2$) disposed in the second outlet conduit at or downstream of the second reactant outlet ($RO_2$). The programmable logic controller (C) is adapted and configured to control relative proportions of the second main flow ($MF_2$) and second bypass flow ($BF_2$) produced by division of the second feed flow ($FF_2$) of cool reactant by the second control valve ($CV_2$) based upon a temperature of the second combined flow ($CF_2$) sensed by the second temperature sensor ($T_2$).

the means for exchanging heat between the first bypass flow ($BF_1$) and the flow of hot shell-side fluid in the heat exchange space comprises:
1) a first bypass inlet plenum (28) receiving the first bypass flow ($BF_1$), the first bypass inlet plenum (28) terminating in a downstream direction at a first tubesheet (30);
2) a first set of bypass tubes (33) fluidly communicating with the first bypass inlet plenum (28), extending downstream from the first tubesheet (30), and terminating at open downstream ends (34); and the means for exchanging heat between the first main flow ($MF_1$) and a flow of a hot shell-side fluid in the heat exchange space comprises:
1) a first main inlet plenum (29) receiving the first main flow ($MF_1$) and which terminates in a downstream direction at a second tubesheet (31),
2) a first set of main tubes (32) each one of which communicates with the first main inlet plenum (29), concentrically surrounds a respective one of the first set of bypass tubes (33), and extends downstream of the second tubesheet (31) past the open downstream ends (34) of the first set of bypass tubes (33).

the first main inlet plenum (29) surrounds the first set of bypass tubes (33) in sealing fashion in between the first and second tubesheets (30, 31).

each of the main tubes (32) in the first set of main tubes (32) fluidly communicates with the first reactant outlet ($RO_1$).

the means for combining the first main flow ($MF_1$) with the first bypass flow ($BF_1$) to produce a first combined flow ($CF_1$) of heated reactant comprises portions of the main tubes (32) of the first set of main tubes (32) where the first bypass flow ($BF_1$) exits the open downstream ends (34) and combines with the first main flow ($MF_1$) flowing in annular spaces in between the first set of main tubes (32) and the first set of bypass tubes 33).

remaining portions of the first set of main tubes (32) downstream of the open ends allows heat exchange between the first combined flow ($CF_1$) and the hot shell-side fluid.

the means for exchanging heat between the first bypass flow ($BF_1$) and the flow of hot shell-side fluid in the heat exchange space comprises:
1) a first bypass inlet plenum (28) receiving the first bypass flow ($BF_1$), the first bypass inlet plenum (28) terminating in a downstream direction at a first tubesheet (30);
2) a first set of bypass tubes (33) fluidly communicating with the first bypass inlet plenum (28), extending downstream from the first tubesheet (30), and terminating at open downstream ends (34); and the means for exchanging heat between the first main flow ($MF_1$) and a flow of a hot shell-side fluid in the heat exchange space comprises:
1) a first main inlet plenum (29) receiving the first main flow ($MF_1$) and which terminates in a downstream direction at a second tubesheet (31),
2) a first set of main tubes (32) each one of which communicates with the first main inlet plenum (29), concentrically surrounds a respective one of the first set of bypass tubes (33), and extends downstream of the second tubesheet (31) past the open downstream ends (34) of the first set of bypass tubes (33);

the first main inlet plenum (29) surrounds the first set of bypass tubes (33) in sealing fashion in between the first and second tubesheets (30, 31);

each of the main tubes (32) in the first set of main tubes (32) fluidly communicates with the first reactant outlet ($RO_1$); and the means for combining the first main flow ($MF_1$) with the first bypass flow ($BF_1$) to produce a first combined flow ($CF_1$) of heated reactant comprises portions of the main tubes (32) of the first set of main tubes (32) where the first bypass flow ($BF_1$) exits the open downstream ends (34) and combines with the first main flow ($MF_1$) flowing in annular spaces in between the first set of main tubes (32) and the first set of bypass tubes 33);

remaining portions of the first set of main tubes (32) downstream of the open ends allows heat exchange between the first combined flow ($CF_1$) and the hot shell-side fluid;

the means for exchanging heat between the second bypass flow ($BF_2$) and the flow of hot shell-side fluid in the heat exchange space comprises:
1) a second bypass inlet plenum (48) receiving the second bypass flow ($BF_2$), the second bypass inlet plenum (48) terminating in a downstream direction at a fourth tubesheet (50), the fourth tubesheet (50) extending in a same plane with the first tubesheet (31);
2) a second set of bypass tubes (53) fluidly communicating with the second bypass inlet plenum (48), extending downstream from the fourth tubesheet (50), and terminating at open downstream ends (54);

the means for exchanging heat between the second main flow ($MF_2$) and a flow of a hot shell-side fluid in the heat exchange space comprises:
1) a second main inlet plenum (49) receiving the second main flow ($MF_2$) and which terminates in a downstream direction at the second tubesheet (31),
2) a second set of main tubes (52) each one of which communicates with the second main inlet plenum (49), concentrically surrounds a respective one of the second set of bypass tubes (53), and extends downstream of the second tubesheet (31) past the open downstream ends (54) of the second set of bypass tubes (53);

the second main inlet plenum (49) surrounds the second set of bypass tubes (53) in sealing fashion in between the fourth and second tubesheets (50, 31);

each of the main tubes (52) in the second set of main tubes (52) fluidly communicates with the second reactant outlet ($RO_2$);

the means for combining the second main flow ($MF_2$) with the second bypass flow ($BF_2$) to produce a second combined flow ($CF_2$) of heated reactant comprises portions of the main tubes (52) of the second set of main tubes (52) where the second bypass flow ($BF_2$) exits the open downstream ends (54) and combines with the second main flow ($MF_2$) flowing in annular spaces in between the second set of main tubes (52) and the second set of bypass tubes (53); and remaining portions of the second set of main tubes (52) downstream of the open ends (54) allows heat exchange between the second combined flow ($CF_2$) and the hot shell-side fluid.

the means for exchanging heat between the first bypass flow ($BF_1$) and the flow of hot shell-side fluid in the heat exchange space comprises a first inlet conduit (66) receiving the first bypass flow ($BF_1$) from the first control valve ($CV_1$), the first inlet conduit (66) extending into the interior of the heat exchanger;

the means for combining the first main flow ($MF_1$) with the first bypass flow ($BF_1$) to produce a first combined flow ($CF_1$) of heated reactant comprises a first inlet plenum (69) fluidly communicating with the first inlet conduit (66); and the means for exchanging heat between the first main flow ($MF_1$) and a flow of a hot shell-side fluid in the heat exchange space comprises at least one first main flow tube (68) fluidly communicating between the first control valve ($CV_1$) and the first inlet plenum (69) that extends into an interior of the heat exchanger downstream of the first inlet plenum (69) and extends back to terminate at the first inlet plenum (69);

the heat exchanger further comprises a first outlet plenum (114) fluidly communicating with the first reactant outlet ($RO_1$); and the heat exchanger further comprises at least one first reactant tube (71) fluidly communicating between the first inlet plenum (69) and the first reactant outlet ($RO_1$) that allows the first combined flow ($CF_1$) to exchange heat with the hot shell-side fluid.

the means for exchanging heat between the first bypass flow ($BF_1$) and the flow of hot shell-side fluid in the heat exchange space comprises a first inlet conduit (66) receiving the first bypass flow ($BF_1$) from the first control valve ($CV_1$), the first inlet conduit (66) extending into the interior of the heat exchanger;

the means for combining the first main flow ($MF_1$) with the first bypass flow ($BF_1$) to produce a first combined flow ($CF_1$) of heated reactant comprises a first inlet plenum (69) fluidly communicating with the first inlet conduit (66); and the means for exchanging heat between the first main flow ($MF_1$) and a flow of a hot shell-side fluid in the heat exchange space comprises at least one first main flow tube (68) fluidly communicating between the first control valve ($CV_1$) and the first inlet plenum (69) that extends into an interior of the heat exchanger downstream of the first inlet plenum (69) and extends back to terminate at the first inlet plenum (69);

the heat exchanger further comprises a first outlet plenum (114) fluidly communicating with the first reactant outlet ($RO_1$); and the heat exchanger further comprises at least one first reactant tube (71) fluidly communicating between the first inlet plenum (69) and the first reactant outlet ($RO_1$) that allows the first combined flow ($CF_1$) to exchange heat with the hot shell-side fluid;

the means for exchanging heat between the second bypass flow ($BF_2$) and the flow of hot shell-side fluid in the heat exchange space comprises a second inlet conduit (86) receiving the second bypass flow ($BF_2$) from the second control valve ($CV_2$), the second inlet conduit (86) extending into the interior of the heat exchanger;

the means for combining the second main flow ($MF_2$) with the second bypass flow ($BF_2$) to produce a second combined flow ($CF_2$) of heated reactant comprises a second inlet plenum (89) fluidly communicating with the second inlet conduit (86); and the means for exchanging heat between the second main flow ($MF_2$) and a flow of a hot shell-side fluid in the heat exchange space comprises at least one second main flow tube (88) fluidly communicating between the second control valve ($CV_2$) and the second inlet plenum (89) that extends into an interior of the heat exchanger downstream of the second inlet plenum (89) and extends back to terminate at the second inlet plenum (89);

the heat exchanger further comprises a second outlet plenum (115);

the heat exchanger further comprises at least one second reactant tube (91) fluidly communicating between the second inlet plenum (89) and the second outlet plenum (115) that allows the second combined flow ($CF_2$) to exchange heat with the hot shell-side fluid.

the means for exchanging heat between the first main flow ($MF_1$) and a flow of a hot shell-side fluid in the heat exchange space comprises a first plenum (109) receiving the first main flow ($MF_1$) from the first control valve ($CV_1$) and at least one first upstream reactant tube (110) extending inside the shell (35) and receiving the first main flow ($MF_1$) from the first plenum (109);

the means for exchanging heat between the first bypass flow ($BF_1$) and the flow of hot shell-side fluid in the heat exchange space comprises a first bypass tube (107) receiving the first bypass flow ($BF_1$) from the first control valve ($CV_1$) and extending at least partially outside the shell (35) of the heat exchanger;

the means for combining the first main flow ($MF_1$) with the first bypass flow ($BF_1$) to produce a first combined flow ($CF_1$) of heated reactant comprises a second plenum (111) that receives the first main flow ($MF_1$) downstream of the at least one first upstream reactant tube (110) and the first bypass flow ($bF_1$) from the first bypass tube (107); and the heat exchanger further comprises at least one first downstream reactant tube (112) and a third plenum (113) that fluidly communicates with the first reactant outlet ($RO_1$), the at least one first downstream reactant tube (112) receiving the first combined flow ($CF_1$) and extending inside the shell (35) between the second and third plenums (109, 111) to allow heat exchange between the first combined flow ($CF_1$) and the hot shell-side fluid.

the means for exchanging heat between the first main flow ($MF_1$) and a flow of a hot shell-side fluid in the heat exchange space comprises a first plenum (109) receiving the first main flow ($MF_1$) from the first control valve ($CV_1$) and at least one first upstream reactant tube (110) extending inside the shell (35) and receiving the first main flow ($MF_1$) from the first plenum (109);

the means for exchanging heat between the first bypass flow ($BF_1$) and the flow of hot shell-side fluid in the heat exchange space comprises a first bypass tube (107) receiving the first bypass flow ($BF_1$) from the first control valve ($CV_1$) and extending at least partially outside the shell (35) of the heat exchanger;

the means for combining the first main flow ($MF_1$) with the first bypass flow ($BF_1$) to produce a first combined flow ($CF_1$) of heated reactant comprises a second plenum (111) that receives the first main flow ($MF_1$) downstream of the at least one first upstream reactant tube (110) and the first bypass flow ($bF_1$) from the first bypass tube (107); and the heat exchanger further comprises at least one first downstream reactant tube (112) and a third plenum (113) that fluidly communicates with the first reactant outlet ($RO_1$), the at least one first downstream reactant tube (112) receiving the first combined flow ($CF_1$) and extending inside the shell (35) between the second and third plenums (109, 111) to allow heat exchange between the first combined flow ($CF_1$) and the hot shell-side fluid;

the means for exchanging heat between the second main flow ($MF_2$) and a flow of a hot shell-side fluid in the heat exchange space comprises a fourth plenum (109) receiving the second main flow ($MF_2$) from the second control valve ($CV_2$) and at least one second upstream reactant tube (110) extending inside the shell (35) receiving the second main flow ($MF_2$) from the fourth plenum (109);

the means for exchanging heat between the second bypass flow ($BF_2$) and the flow of hot shell-side fluid in the heat exchange space comprises a second bypass tube (107) receiving the second bypass flow ($BF_2$) from the second control valve ($CV_2$) and extending at least partially outside the shell (35) of the heat exchanger;

the means for combining the second main flow ($MF_2$) with the second bypass flow ($BF_2$) to produce a second combined flow ($CF_2$) of heated reactant comprises a fifth plenum (111) that receives the second main flow ($MF_2$) from the at least one second upstream reactant tube (110) and the second bypass flow ($BF_2$) from the second bypass tube (107); and the heat exchanger further comprises at least one second downstream reactant tube (112) and a sixth plenum (113) that fluidly communicates with the at least one second reactant outlet ($RO_2$), the at least one second downstream reactant tube (112) receiving the second combined flow ($CF_2$) and extending inside the shell (35) between the fifth and sixth plenums (111, 113) to allow heat exchange between the second combined flow ($CF_2$) and the hot shell-side fluid.

a recuperator or regenerator (5) hays an outlet (6) in fluid communication with the shell inlet (SI), the recuperator or regenerator (4) adapted and configured to allow the shell-side fluid to be heated and conveyed to the heat exchange space via the shell inlet (SI).

the recuperator or regenerator (5) includes an inlet (4) in fluid communication with the shell outlet (SO), the recuperator or regenerator (5) receiving cooled shell-side fluid from the shell outlet (SO) and heating the cooled shell-side fluid to produce the hot shell-side fluid.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION

The inventive method and heat exchange system for reducing overheating of internal components of a counter-flow shell and tube heat exchanger utilizes variable partial bypass of a reactant flow. In general, a tube-side feed flow is divided with a control valve into two separate flows: a main flow and a bypass flow. Both flows are fed to the tube-side inside the heat exchanger and combined at a point between the upstream and downstream ends. The paths of the main flow and bypass flow are configured, sized, and structured to achieve greater heat transfer between the hot shell-side fluid and the main flow than between the hot shell-side fluid and the bypass flow. Based upon the temperature of the combined flow at or downstream of the heat exchanger outlet, the relative amounts of the main flow and the bypass flow may be adjusted with the control valve in order to control the temperature of the combined flow.

The number of feed flows is not limited to only one or two. Rather, the number of feed flows is driven by the process requirements. Typically, it ranges from 2-12. Control of the relative proportions of one feed flow into corresponding main and bypass flows is independent of control of the relative proportions of any of the other feed flows into main and bypass flows. This means that adjustment in the relative proportions of the main and bypass flows may be made without the same adjustment in the relative proportions of the other main and bypass flows.

The invention avoids or reduces the possibility (that is experienced by prior art solutions) that the temperature of the tube-side fluid near the outlet will exceed the material limit temperature of the internal components of the heat exchanger. By reducing the degree to which the bypass flow is heated, the overall temperature of the tube-side fluid exiting the heat exchanger may be lowered. Also, by recombining the flows inside the heat exchanger, the temperature overshoot experienced by prior art schemes may be avoided or reduced because the combined flow (after the point at which the two flows are combined inside the heat exchanger) remains the same regardless of whether all, none, or some of the flow partially bypasses the heat exchanger in the bypass flow. Thus, the rate at which heat is transferred from the shell-side hot fluid to the combined flow will not change when there is a change in the relative amounts of the main flow and bypass flow.

Figure 1:
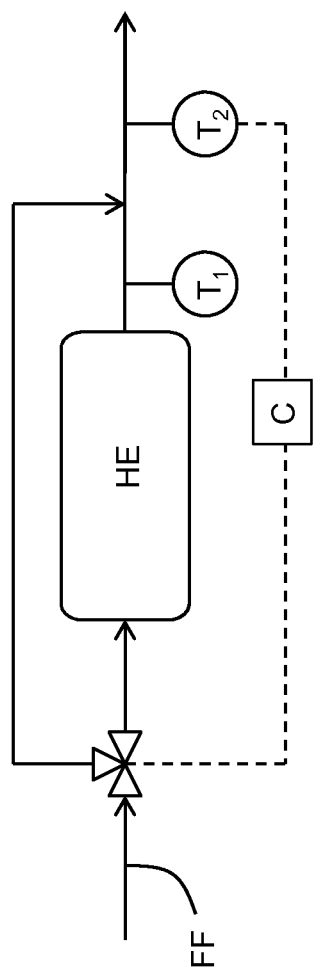
FIG. 1 is a schematic of one prior art heat recovery solution utilizing bypass of a fluid.
Figure 2:
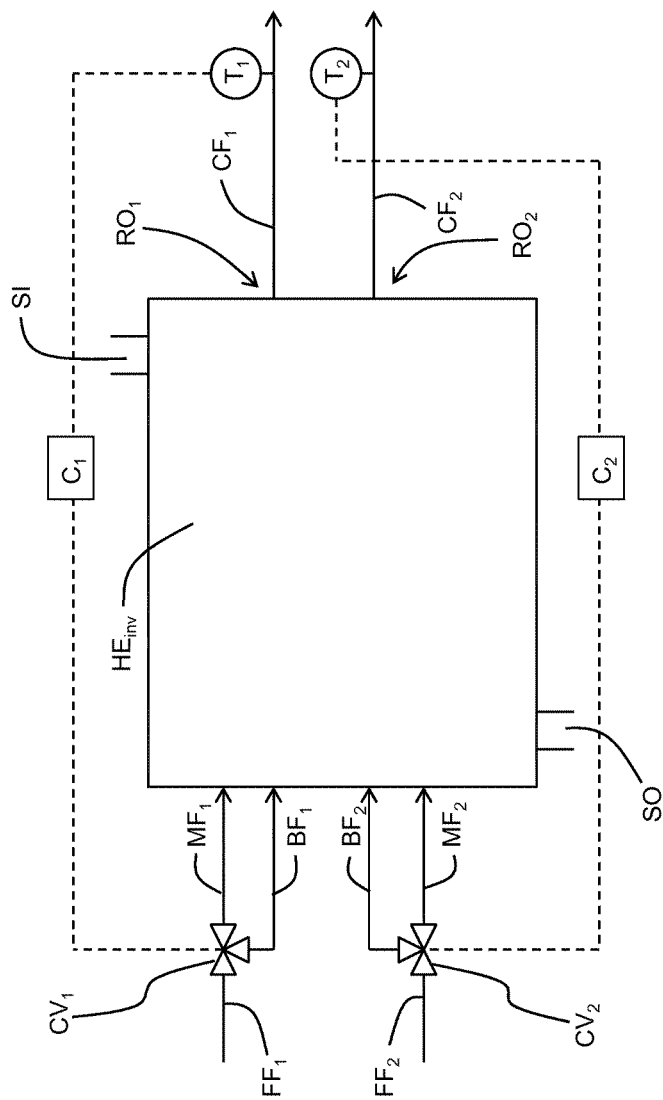
FIG. 2 is a schematic of the heat recovery solution of the invention.

As best illustrated in FIG. 2, first feed flow ($FF_1$) of a cool reactant is divided with a first control valve ($CV_1$) between a first main flow ($MF_1$) of the cool reactant and a first bypass flow ($BF_1$) of the cool reactant. The first main flow ($MF_1$) flows through a counter-flow shell and tube heat exchanger $HE_{inv}$ on a tube-side thereof. Heat at the shell and tube heat exchanger $HE_{inv}$ is exchanged between the first main flow ($MF_1$) and a flow of a hot shell-side fluid via shell inlet (SI). The first main flow ($MF_1$) is combined with the first bypass flow ($BF_1$) to produce a first combined flow ($CF_1$) of heated reactant. The first combined flow ($CF_1$) exits the heat exchanger $HE_{inv}$ at a first reactant outlet ($RO_1$) thereof, while a flow of cooled shell-side fluid exits via shell outlet (SO). A temperature of the first combined flow ($CF_1$) is measured at or downstream of the first reactant outlet ($RO_1$). The relative proportions of the first main flow ($MF_1$) and first bypass flow ($BF_1$), resulting from division of the first feed flow ($FF_1$), with the control valve ($CV_1$) is controlled based upon the measured temperature of the first combined flow ($CF_1$).

Other details of the heat exchanger are as follows. There is at least one first downstream reactant tube (92) that receives the first combined flow ($CF_1$) and fluidly communicates with a first reactant outlet ($RO_1$). The number of downstream reactant tubes (92) may vary depending upon the flows of the tube-side fluid and the specific heat exchanger design employed. Typically, it ranges from 2-12. A first outlet conduit fluidly communicates with the first reactant outlet ($RO_1$) and receiving the first combined flow ($CF_1$) therefrom. A first temperature sensor ($T_1$) is disposed in the outlet conduit at or downstream of the first reactant outlet ($RO_1$). A programmable logic controller ($C_1$) is adapted and configured to control relative proportions of the first main flow ($MF_1$) and first bypass flow ($BF_1$) produced by division of the first feed flow ($FF_1$) of cool reactant by the first control valve ($CV_1$). The control is based upon a temperature of the first combined flow ($CF_1$) sensed by the first temperature sensor ($T_1$).

Less heat is transferred from the shell-side fluid to the first bypass flow ($BF_1$) than is transferred from the shell-side fluid to the first main flow ($MF_1$). One of ordinary skill in the art will recognize the degree to which the main flow and the bypass flow are heated by the hot shell-side fluid is driven by several factors. A non-limiting list includes: the length of the main flow path and the bypass flow path, the cross-sectional surface area of the main flow path and the bypass flow path, the thickness of the tubes conveying the main and bypass flows, the presence of an intermediary fluid in between the hot shell-side fluid and the main flow or in between the hot shell-side fluid and the bypass flow, the material comprising the tubes conveying the main and bypass flows, and the route of the two flow paths. While three embodiments for achieving the relatively lower heat exchange between the hot shell-side fluid and the bypass tube-side fluid are illustrated, any design that achieves the lower heat exchange result is within the scope of the invention.

Three heat exchanger elements of note include: means for exchanging heat between the first main flow ($MF_1$) and a flow of a hot shell-side fluid in the heat exchange space; means for exchanging heat between the first bypass flow ($BF_1$) and the flow of hot shell-side fluid in the heat exchange space; and means for combining the first main flow ($MF_1$) with the first bypass flow ($BF_1$) to produce a first combined flow ($CF_1$) of heated. As discussed above, while a wide variety of different approaches may be taken apart from the illustrated embodiments, the means for exchanging heat between the first main flow ($MF_1$) and the flow of the hot shell-side fluid is configured and adapted to allow more heat to be exchanged between the first main flow ($MF_1$) and the flow of hot shell-side fluid than is exchanged between the first bypass flow ($BF_1$) and the flow of hot shell-side fluid by the means for exchanging heat between the first bypass flow ($BF_1$) and the flow of hot shell-side fluid.

The method and system may optionally include a second feed flow which is also treated in a similar manner. A second feed flow ($FF_2$) of a cool reactant is divided with a second control valve ($CV_2$) between a second main flow ($MF_2$) of the cool reactant and a second bypass flow ($BF_2$) of the cool reactant. The second main flow ($MF_2$) flows through a shell and tube heat exchanger on the tube-side. Heat at the shell and tube heat exchanger is exchanged between the second main flow ($MF_2$) and the flow of a hot shell-side fluid. The second main flow ($MF_2$) is combined with the second bypass flow ($BF_2$) to produce a second combined flow ($CF_2$) of heated reactant. The second combined flow ($CF_2$) exits the heat exchanger $HE_{inv}$ at a second reactant outlet ($RO_2$). A temperature of the second combined flow ($CF_2$) is measured at or downstream of the second reactant outlet ($RO_2$). A programmable logic controller ($C_2$) is adapted and configured to control relative proportions of the second main flow ($MF_2$) and second bypass flow ($BF_2$), resulting from division of the second feed flow ($FF_2$), with the second control valve ($CV_2$) are controlled based upon the measured temperature of the second combined flow ($CF_2$). Alternatively, only a single programmable logic controller ($C_1$) may be used to perform both control functions. Similar to the first main and bypass flows, less heat is transferred from the shell-side fluid to the second bypass flow ($BF_2$) than is transferred from the shell-side fluid to the second main flow ($MF_2$). Control of the relative proportions of the second feed flow ($FF_2$) into the second main and bypass flows ($MF_2$, $BF_2$) is independent of control of the relative proportions of the second feed flow ($FF_2$) into the second main and bypass flows ($MF_2$, $BF_2$). This means that adjustment in the relative proportions of the first main and bypass flows may be made without the same adjustment in the relative proportions of the second main and bypass flows.

The heat exchanger is a counter-flow shell and tube heat exchanger. This means that there is at least some directional component of hot shell-side fluid flow that is counter to the direction of the tube-side fluid. While the hot shell-side fluid may be introduced into the interior of the shell at an angle to the direction of the tubes, the use of internal baffles is contemplated in such a case for imparting the desired counter-current behavior of the tube-side and shell-side fluids.

While the tube-side reactant may be any fluid sought to be heated through heat exchange with the hot shell-side fluid, typically the tube-side reactant is an oxidant having an oxygen concentration higher than that of air or the reactant is a fuel. It is important to note that, while the term "reactant" is used throughout the Summary, Detailed Description and Claims, the tube-side fluid need not be reactive. Rather, it may optionally be inert as understood by one of ordinary skill in the art of fields of heat exchange or combustion. Thus, an inert "reactant" may be utilized in any of the numerous embodiments or aspects of the invention discussed herein. Typically, the oxidant is industrially pure oxygen or oxygen-enriched air. If the fuel is not being pre-heated at the heat exchanger, the fuel may be any fuel conventionally used in furnaces, including solid, liquid or gaseous fuels. If the fuel is being pre-heated at the heat exchanger, the fuel is a gaseous fuel such as methane, natural gas or propane. While the shell-side fluid may similarly be any fluid intended for heating the tube-side fluid, typically the shell-side fluid is air, carbon dioxide, or an inert gas such as nitrogen or helium, or any mixture of the foregoing. In either case, air or inert gas may first be heated at a recuperator or regenerator prior to being introduced into the heat exchanger.

Now, three embodiments of specific heat exchanger designs will be described.

Figure 3:
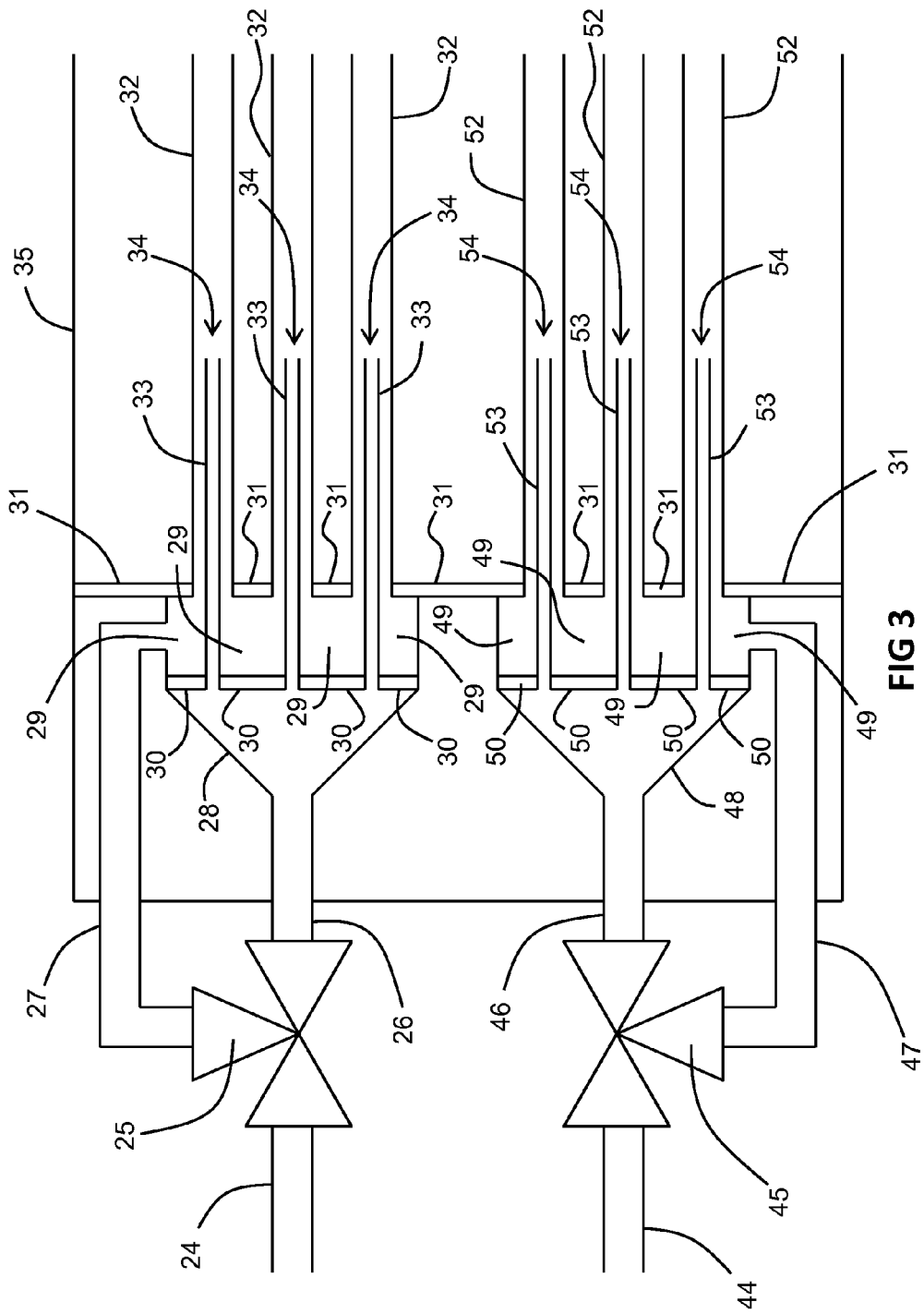
FIG. 3 is a schematic of one embodiment of the invention illustrating only an upstream portion of the heat exchanger.

In the first embodiment and as illustrated in FIG. 3, a first bypass inlet plenum (28) receives the first bypass flow ($BF_1$). The first bypass inlet plenum (28) terminates in a downstream direction at a first tubesheet (30). A first set of bypass tubes (33) fluidly communicates with the first bypass inlet plenum (28), extends downstream from the first tubesheet (30), and terminates at open downstream ends (34). A first main inlet plenum (29) receives the first main flow ($MF_1$). The first main inlet plenum (29) terminates in a downstream direction at a second tubesheet (31). The first main inlet plenum (29) surrounds the first set of bypass tubes (33) in sealing fashion in between the first and second tubesheets (30, 31). Each one of a first set of main tubes (32) fluidly communicates with the first main inlet plenum (29), extends downstream of the second tubesheet (31), and concentrically surrounds a respective one of the first set of bypass tubes (33). Each of the main tubes (32) in the first set of main tubes fluidly communicates with the first reactant outlet ($RO_1$). At each open downstream end (34) of one of the bypass tubes (33) of the first set of bypass tubes (33), a portion of the first main flow ($MF_1$) combines with a respective portion of the first bypass flow ($BF_1$) to form a portion of the first combined flow ($CF_1$) which flows along a remaining downstream portion of the respective main tube (32) to the first reactant outlet ($RO_1$). Heat exchange between the first bypass flow ($BF_1$) and the hot shell-side fluid is achieved via the first main flow ($MF_1$) flowing in annular spaces in between the first set of main tubes (32) and the first set of bypass tubes (33).

With continuing reference to FIG. 3, a second bypass inlet plenum (48) receives the second bypass flow ($BF_2$). The second bypass inlet plenum (48) terminates in a downstream direction at a fourth tubesheet (50). The fourth tubesheet (50) extending in a same plane with the first tubesheet (31). A second set of bypass tubes (53) fluidly communicates with the second bypass inlet plenum (48), extends downstream from the fourth tubesheet (31), and terminates at open downstream ends (54). A second main inlet plenum (49) receives the second main flow ($MF_1$). The second main inlet plenum (49) terminates in a downstream direction at the second tubesheet (31). The second main inlet plenum (49) surrounds the second set of bypass tubes (53) in sealing fashion in between the fourth and second tubesheets (50, 31). Each one of a second set of main tubes (52) fluidly communicates with the second main inlet plenum (49), extends downstream of the second tubesheet (31), and concentrically surrounds a respective one of the second set of bypass tubes (53). Each of the main tubes (52) in the second set of main tubes (52) fluidly communicates with a second reactant outlet ($RO_2$). At each open downstream end (54) of one of the bypass tubes (53) of the second set of bypass tubes (53), a portion of the second main flow ($MF_2$) combines with a respective portion of the second bypass flow ($BF_2$) to form a portion of the second combined flow ($CF_1$) which flows along a remaining downstream portion of the respective main tube (52) to the second reactant outlet ($RO_1$).

Similar to the number of reactant tubes discussed above, the number of the main tubes and bypass tubes may vary depending upon the process requirements. Typically, there are 2-12 main tubes and/or bypass tubes. It will be apparent that the first and second main flows ($MF_1$, $MF_2$) will be subjected to greater heat transfer from the hot shell-side fluid than the first and second bypass flows ($BF_1$, $BF_2$) because only the main tubes separate the main flow from the hot shell-side fluid, while in the case of the bypass flow, each of the main tubes, the main flow itself, and each of the bypass tubes separate the first bypass flow from the hot shell-side fluid.

Figure 4:
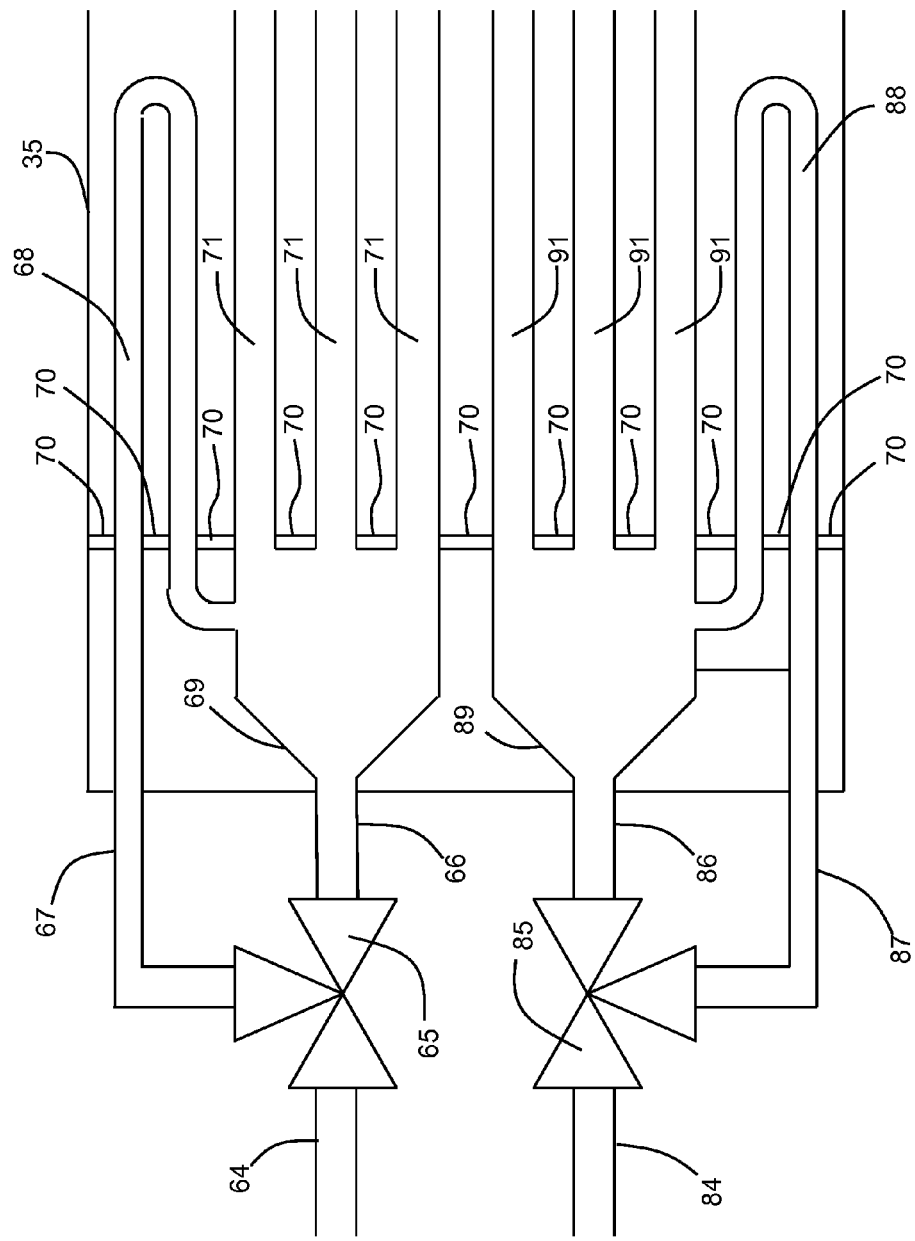
FIG. 4 is a schematic of another embodiment of the invention illustrating only an upstream portion of the heat exchanger.

In the second embodiment and as illustrated in FIG. 4, a first inlet plenum (69) receives the first bypass flow ($BF_1$) where the first inlet plenum (69) is disposed inside the shell (35). A first outlet plenum (114, 113) fluidly communicates with the first reactant outlet ($RO_1$). At least one first reactant tube (71) fluidly communicates between the first inlet plenum (69) and the first outlet plenum (114, 113). At least one first main flow tube (68) receives the first main flow ($MF_1$) from the first control valve ($CV_1$), extends into an interior of the heat exchanger downstream of the first inlet plenum (89) and extends back to terminate at the first inlet plenum (89). The first main flow ($MF_1$) is combined with the first bypass flow ($BF_1$) at the first inlet plenum (69) and the first combined flow ($CF_1$) flows through the at least one first reactant tube (71).

With continuing reference to FIG. 4, a second inlet plenum (89) receives the second bypass flow ($BF_2$) where the second inlet plenum (89) disposed inside the shell (35). A second outlet plenum (115, 113) fluidly communicates with the second reactant outlet ($RO_2$). At least one second reactant tube (91) fluidly communicates between the second inlet plenum (89) and the second outlet plenum (115, 113). At least one second main flow tube (88) receiving the second main flow ($MF_2$) from the second control valve ($CV_2$), extends into an interior of the heat exchanger downstream of the second inlet plenum (89) and extends back to terminate at the second inlet plenum (89). The second main flow ($MF_2$) is combined with the second bypass flow ($BF_2$) at the second inlet plenum (89) and the second combined flow ($CF_2$) flows through the at least one second reactant tube (91).

Similar to the number of reactant tubes discussed above, the number of the main flow tubes (68, 88) and reactant tubes (71, 91) may vary depending upon the process requirements. Typically, there are 2-12 main flow tubes (68, 88) and/or reactant tubes (71, 91). It will be apparent that the first and second main flows ($MF_1$, $MF_2$) will be subjected to greater heat transfer from the hot shell-side fluid than the first and second bypass flows ($BF_1$, $BF_2$) because only the main flows ($MF_1$, $MF_2$) travel a farther distance in heat-transfer contact with the hot shell-side fluid than do the bypass flows ($BF_1$, $BF_2$).

In operation, the ratio of the flow rate of shell-side fluid to the flow rate of the oxidant stream or fuel stream is dependent in a trivial way upon a variety of factors, including the type of shell-side fluid, the type of oxidant, the temperature of the shell-side fluid, the temperature of the oxidant before pre-heated, the temperature of the fuel before pre-heating, the desired hot oxidant and hot fuel temperatures, process requirements, and the particular configuration of the heat exchanger. Typically, the ratio is at least 2:1.

The temperature of the shell-side fluid and the hot combustion gases are also dependent in a trivial way upon a variety of factors, including the type of shell-side fluid, the type of combustion gases, the temperature of the shell-side fluid before heat exchange at the recuperator or regenerator, the temperature of the hot combustion gases, process requirements, and the particular configuration of the recuperator or regenerator. While higher temperatures are possible, typically the hot shell-side fluid is at a temperature up to about 730° C. Typically, the oxidant and fuel before pre-heating are at ambient temperature. After pre-heating, the oxidant is typically at a temperature of up to about 700° C., but higher temperatures are still possible. After pre-heating, the fuel is typically at a temperature of up to about 450° C. After heat exchange between the hot shell-side fluid and the oxidant and fuel streams, the cooled shell-side fluid is typically at a temperature of about 200-300° C.

Optionally, each of the oxidant streams is pre-heated at a first heat exchanger while each of the fuel streams is pre-heated at a second heat exchanger. The flow of hot shell-side fluid may be arranged in parallel whereby two streams of the hot shell-side fluid are directed to the two heat exchangers. The flow hot shell-side fluid may instead be arranged in series whereby one of the oxidant and fuel streams is pre-heated at the first heat exchanger through heat exchange with the hot shell-side fluid, and the now-somewhat cooled hot shell-side fluid exiting the first heat exchanger is used to pre-heat the other of the oxidant and fuel streams at the second heat exchanger.

Optionally, the shell-side fluid may be recirculated. By recirculated, we meant that after heat exchange is performed between the shell-side fluid and the oxidant and/or fuel streams, it is returned to the regenerator or recuperator to complete a circuit. In this case, shell-side fluids other than air become more cost-effective. The shell-side fluid may be chosen so as to optimize heat transfer between conduits, for example, by choosing a fluid of high thermal conductivity such as helium. Alternatively, overall heat transfer may be optimized by choosing a fluid of high heat capacity such as carbon dioxide. Optionally, the shell-side fluid is any other inert gas or mixtures of any of helium, carbon dioxide, and the other inert gas.

The overall design of the heat exchanger is optimized based upon the total power of the combined burners receiving pre-heated oxidant (and/or fuel). This means that the diameter of the oxidant (or fuel) tubes, the number of oxidant (or fuel) tubes, the oxidant (or fuel) tube pitch (i.e., the tube to tube spacing), and the oxidant (or fuel) length to diameter ratio are optimized based upon the total combined power of the burners receiving the pre-heated oxidant (or fuel). Once these variables are optimized, the heat exchanger is provided with a single shell. Then, the oxidant (or fuel) tubes are divided into sets based upon the number of oxidant (or fuel) streams to be pre-heated by the heat exchanger where each set receives a separate oxidant (or fuel) stream. This design optimization can be distinguished from a combination of heat exchangers each one of which has been individually optimized based upon the burners it supplies with pre-heated oxidant or fuel where the combination includes a number of shells equal to the number of heat exchangers combined. A combination of heat exchangers is less efficient than the optimized heat exchanger of the invention. The shell and tube heat exchanger may have a cross-sectional configuration conventionally used in the heat exchanger art, including but not limited to: circular, oval, rectangular, and square.

Figure 5:
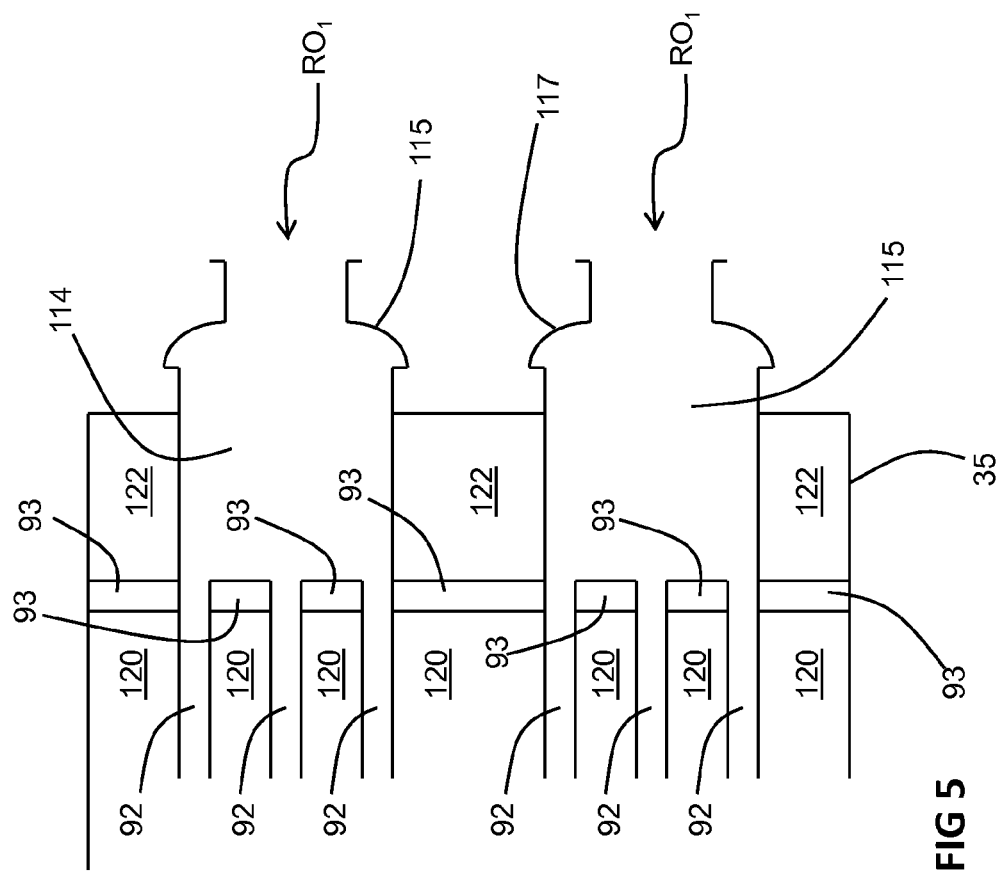
FIG. 5 is a schematic of an embodiment of the invention usable with those of FIGS. 3 and 4 illustrating only a downstream portion of the heat exchanger.
Figure 6:
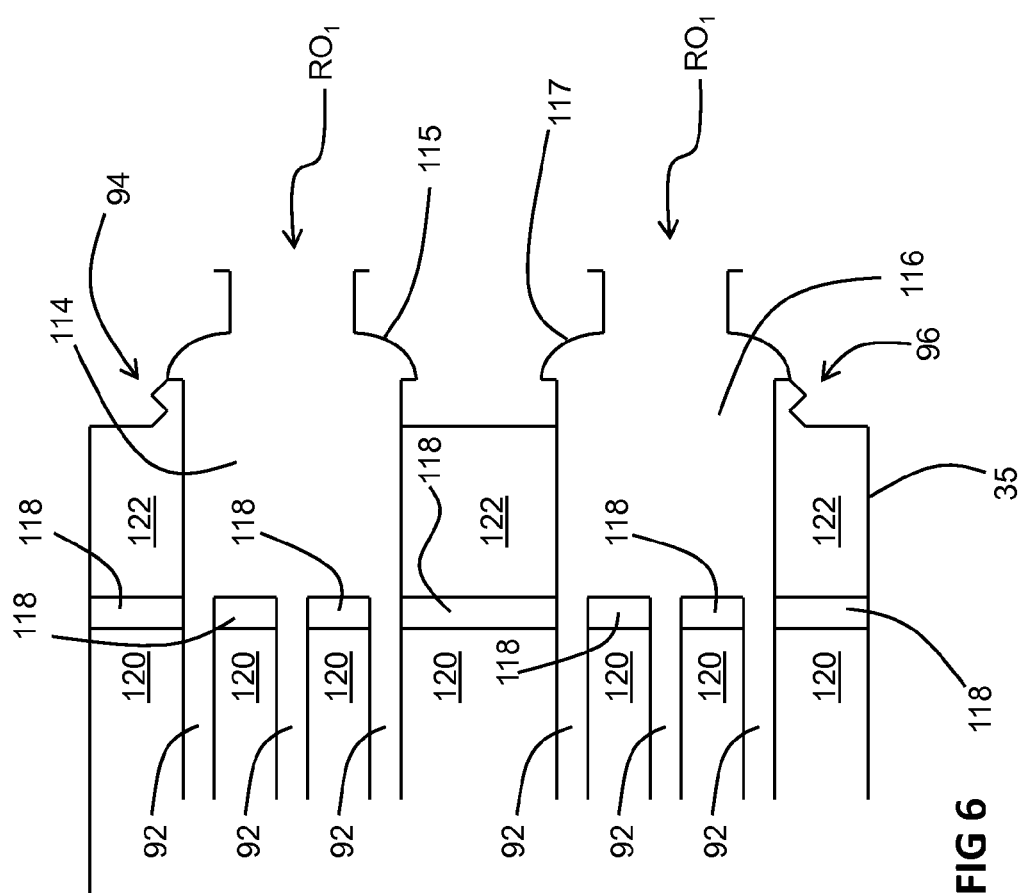
FIG. 6 is a schematic of another embodiment of the invention usable with those of FIGS. 3 and 4 illustrating only a downstream portion of the heat exchanger.

Regardless whether the first or second embodiments is selected, as best illustrated in FIG. 5, the combined flows ($CF_1$, $CF_2$) of oxidant (or fuel) from main tubes 32 or reactant tubes 71, as the case may be, discharge into associated collection spaces 114, 116 that are enclosed and sealed with an associated bonnet 115, 117 (the bonnets associated with other flows of oxidant or fuel are not illustrated in FIG. 6). Each of the bonnets 115, 117 (including those for the other flows) is directly connected to the shell 36. The combination of a downstream tubesheet 93 and oxidant (or fuel) tubes 92 (constituting the downstream portions of the main tubes 32 or reactant tubes 71, as the case may be) separates the hot shell-side fluid flowing through space 120 from the combined flows ($CF_1$, $CF_2$). Space 122 in between the tubesheet 93 and the downstream end of the shell 35 is essentially dead space. One of ordinary skill in the art will recognize that the particular configuration/structure/device for collecting a particular oxidant (or fuel) stream may be chosen from a wide variety of techniques well known in the field of heat exchangers. In this case, each oxidant (or fuel) stream is of course kept separated from the other oxidant (or fuel) streams.

The flow rate of each individual, separately controlled, oxidant (or fuel) stream is typically varied over time in response to process requirements. If the flow rate of one or less than all of the oxidant (or fuel) streams is lowered, the slower oxidant (or fuel) stream flow rate causes that slower-rate stream to be heated to a relatively higher temperature than other faster-rate streams. This is because the longer residence time of the oxidant (or fuel) inside the heat exchanger allows greater heat transfer between the hot heat transfer fluid to the slower-rate stream. Conversely, a higher oxidant (or fuel) stream flow rate causes that faster-rate stream to be heated to a relatively lower temperature than other slower-rate streams because of the shorter residence time of the faster rate stream.

Despite performance of the invention, the thermal expansion or thermal contraction of each oxidant (or fuel) tube conveying a higher (or lower) flow rate stream may be different that those of the other oxidant (or fuel) streams because the higher (or lower) flow rate stream may be heated to a lower (or higher) temperature than the other streams. In order to avoid the possibility that the differing thermal expansions and/or contractions may place undue stresses on the oxidant (or fuel) tubes and the shell, each set of oxidant (or fuel) tubes may be provided with a separate thermal expansion joint. In this manner, the separate joints may allow the differing expansions and contractions of the different sets of tubes without subjecting the heat exchanger to undue stresses. As best illustrated in FIG. 6, each flow of oxidant or fuel discharges into an associated collection space 114, 116 that is enclosed and sealed with an associated bonnet 115, 117 (the bonnets associated with other flows of oxidant or fuel are not illustrated in FIG. 6). Each of the bonnets 115, 117 (including those for the other flows) is connected to the shell 36 via an associated expansion joint 94, 96 in order to accommodate the differing thermal expansion/contraction.

The heat exchanger of FIG. 6 is not provided with the downstream tubesheet 93 as is that of FIG. 5. Rather, the heat exchanger includes a "tube sheet-like" divider 118 that provides an imperfect seal in between, on one hand, the interior portion 120 of the shell through which the hot shell-side fluid flows, and on the other hand, the space 122 in between the divider 118 and the downstream end of the shell 35. The divider 118 includes orifices having a cross-section approximating those of the oxidant (or fuel) tubes 92 only with wider dimensions so that the oxidant (or fuel) tubes 92 may slide through expansion or contraction through the orifices. Instead of using a tubesheet 93 (as illustrated in FIG. 5) to separate the hot shell-side fluid from the oxidant (or fuel) in the collection spaces 114, 116 at the discharge end of the heat exchanger, the combination of the oxidant (or fuel) tubes 92, the expansion joint 94, 96, and the divider 118 keeps the oxidant and hot shell-side fluid separate.

Figure 7:
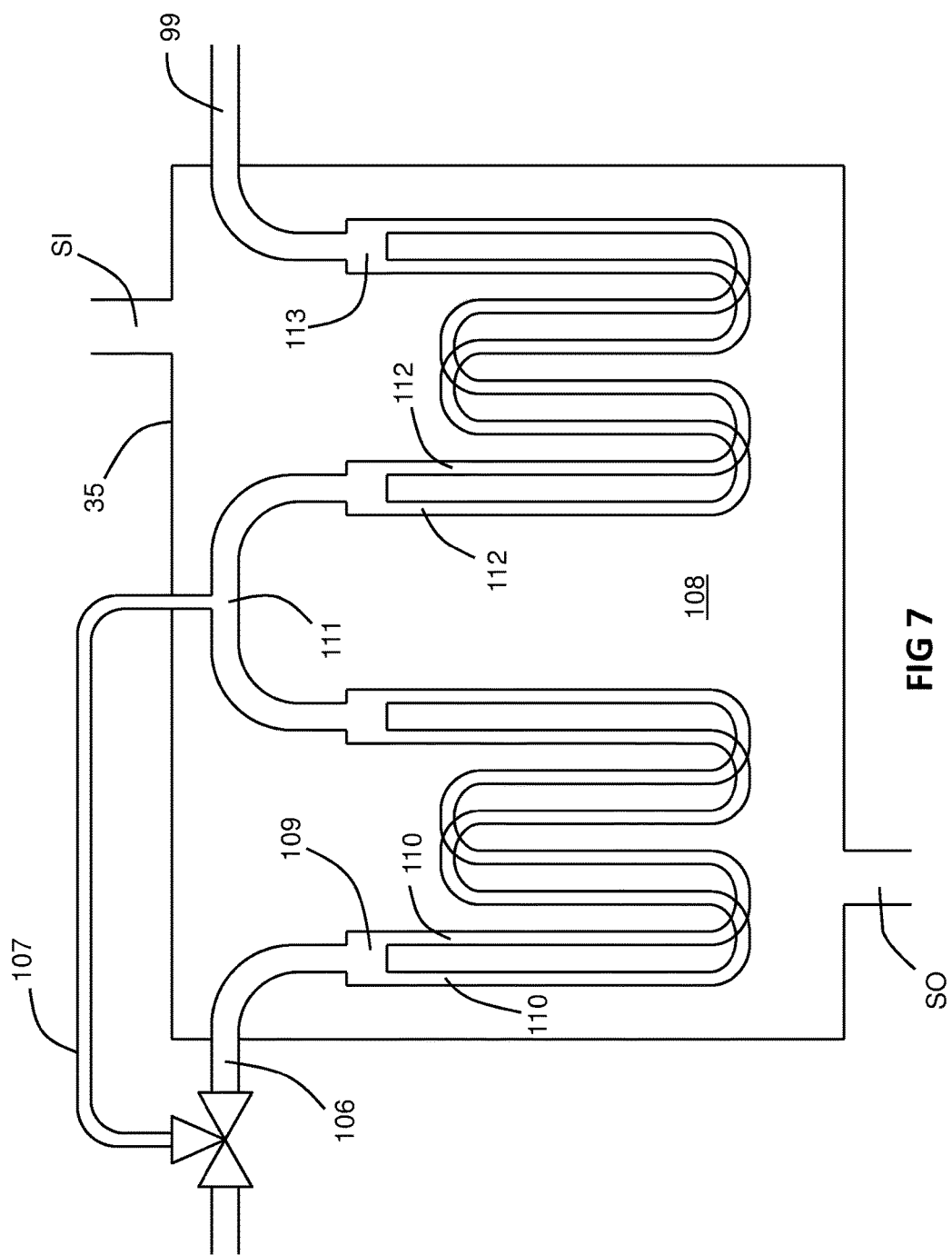
FIG. 7 is a is a schematic of another embodiment of the invention illustrating only one fluid feed, main flow, bypass flow, and combined flow.

In the third embodiment and as illustrated in FIG. 7, the heat exchanger includes first, second and third plenums (109, 111, 113). The third plenum (113) receives the first combined flow ($CF_1$) and fluidly communicates with the first reactant outlet ($RO_1$). At least one first upstream reactant tube (110) receives the first main flow ($MF_1$) and extends through an interior of the shell (35) from the first plenum (109) and fluidly communicates with the second plenum (111). A first bypass tube (107) receives the first bypass flow ($BF_1$) and extends between the first control valve ($CV_1$) and the second plenum (111) and at least partially extends outside the shell of the heat exchanger. The first main flow ($MF_1$) and the first bypass flow ($BF_1$) are combined at the second plenum (111). At least one first downstream reactant tube (112) receiving the first combined flow ($CF_1$) and extending between the second and third plenums (111, 113).

The shell and tube heat exchanger may also include duplicate elements for a second feed flow ($FF_2$). For reasons of clarity, FIG. 7 does not illustrate the duplicate elements. But it will be understood that the first main flow ($MF_1$) and first bypass flow ($MF_2$) may be replicated with a similar second main flow ($MF_2$) and second bypass flow ($BF_2$) placed parallel to the first main flow ($MF_1$) and first bypass flow ($BF_1$). As discussed above, the number of different feed flows is not limited. Thus, it may be seen that the design of the embodiment of FIG. 8 may be scaled up or down in a modular fashion to suit the process requirements.

Similar to the number of reactant tubes discussed above, the number of the upstream and downstream reactant tubes (110, 112) is not limited and may vary depending upon process requirements and the specific heat exchanger design selected. Typically, it ranges from 2-12.

Regardless of whether the first, second or third embodiment is selected, the hot shell-side fluid is typically obtained from a recuperator or regenerator (4). Optionally, the cooled shell-side fluid may be recycled back to the recuperator or regenerator to heat the cooled shell-side fluid in order to produce the hot shell-side fluid.

While the heat exchange method and system may be applied to a wide variety of process requiring heat exchange between a relatively cooler tube-side fluid and a relatively warmer shell-side fluid, the method and system is advantageously used with preheating of either oxidant or fuel for burners, more particularly, for burners associated with a melting furnace, such as a blast furnace, metal melting furnace, or glass furnace.

Figure 8:
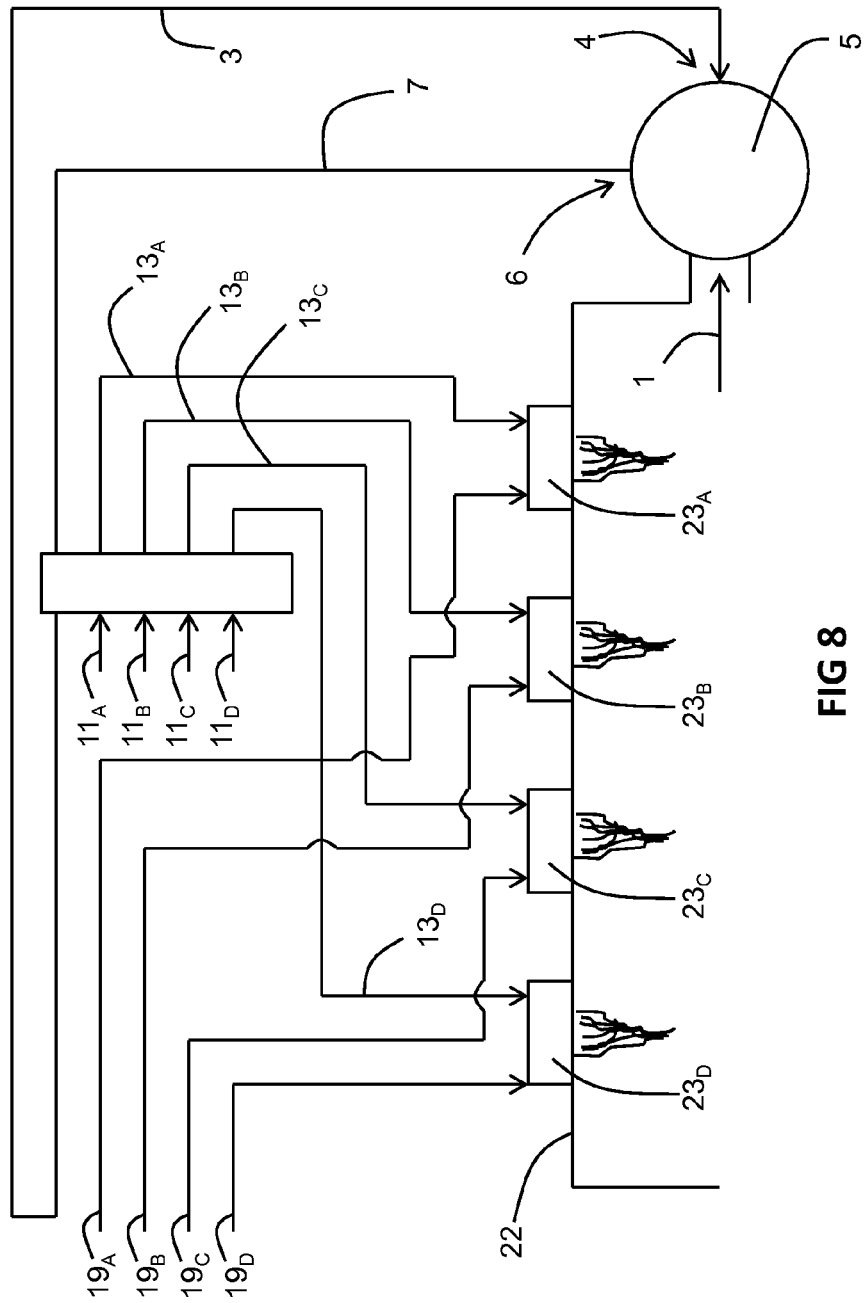
FIG. 8 is a schematic of one application of the invention to a furnace utilizing oxidant preheating.

One generalized and illustrative application of the invention to a furnace is shown in FIG. 8. Hot combustion gases 1 preheat a heat transfer fluid (i.e., the shell-side fluid) 3 at a recuperator or regenerator 5. The resultant hot shell-side fluid 7 flows to a heat exchanger 9 for preheating oxidant where it exchanges heat with flows of cold oxidant $11_A$, $11_B$, $11_C$, $11_D$. The resultant flows of hot oxidant $13_A$, $13_B$, $13_C$, $13_D$ are directed to burners $23_A$, $23_B$, $23_C$, $23_D$. The flows of fuel $19_A$, $19_B$, $19_C$, $19_D$ are directed to the burners $23_A$, $23_B$, $23_C$, $23_D$ where the fuel combusts with the hot oxidant to produce the hot combustion gases 1. The hot shell-side fluid is cooled at heat exchanger 9 and is optionally recirculated to the recuperator or regenerator 5 as the shell-side fluid 3 to complete a loop.

Figure 9:
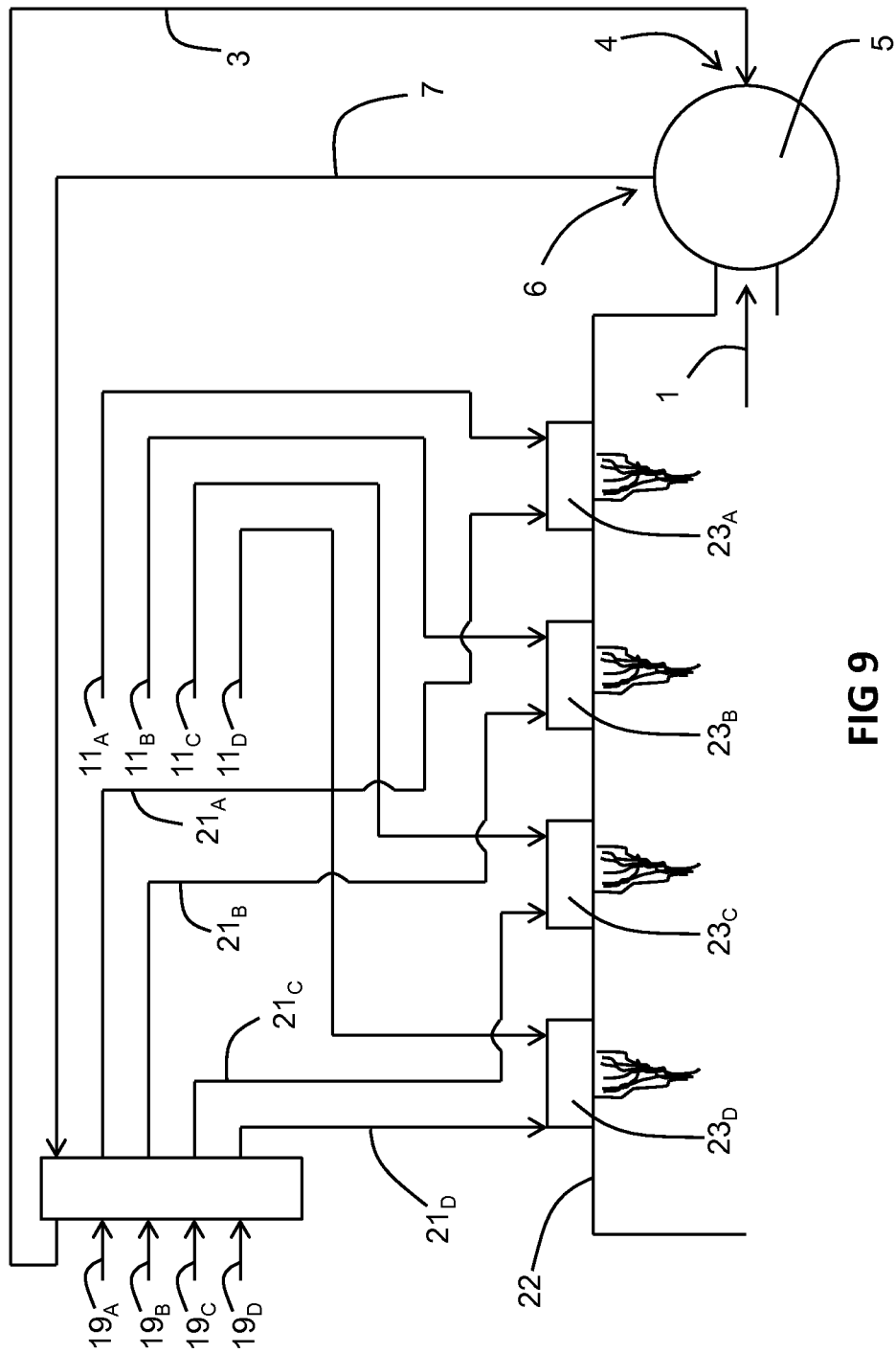
FIG. 9 is a schematic of one application of the invention to a furnace utilizing fuel preheating.

Another generalized and illustrative application of the invention to a furnace is shown in FIG. 9. Hot combustion gases 1 preheat the shell-side fluid 3 at a recuperator or regenerator 5. The resultant hot shell-side fluid 7 flows to a heat exchanger 17 for preheating fuel where it exchanges heat with flows of cold fuel $19_A$, $19_B$, $19_C$, $19_D$. The resultant flows of hot fuel $21_A$, $21_B$, $21_C$, $21_D$ are directed to the burners $23_A$, $23_B$, $23_C$, $23_D$ where the hot fuel combusts with the flows of oxidant $11_A$, $11_B$, $11_C$, $11_D$. The hot shell-side fluid is cooled at heat exchanger 17 and is optionally recirculated to the recuperator or regenerator 5 as the shell-side fluid 3 to complete a loop.

Figure 10:
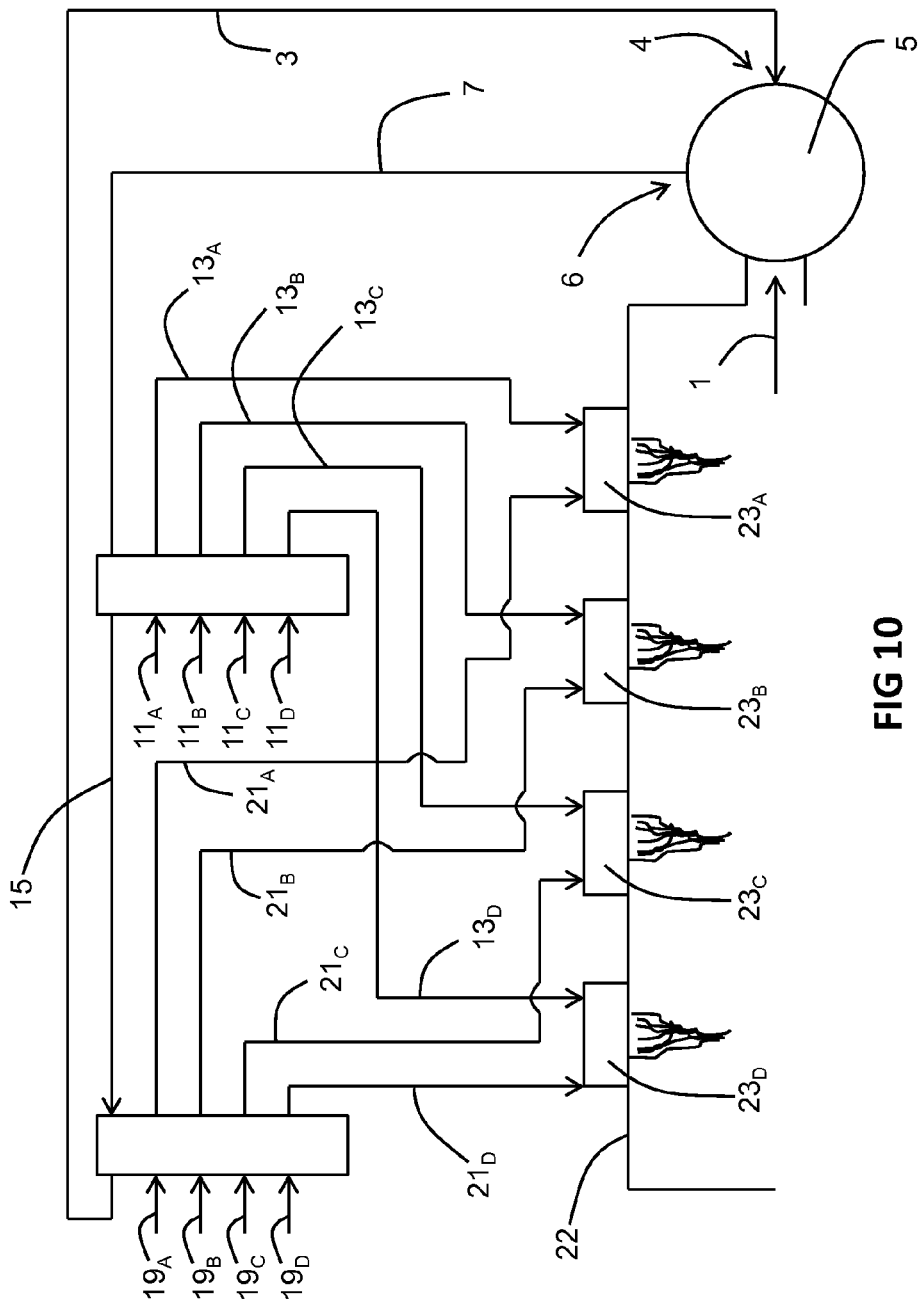
FIG. 10 is a schematic of one application of the invention to a furnace utilizing both oxidant and fuel preheating.

Another generalized and illustrative application of the invention to a furnace is shown in FIG. 10. Hot combustion gases 1 preheat the shell-side fluid 3 at a recuperator or regenerator 5. The resultant hot shell-side fluid 7 flows to a heat exchanger 9 for preheating oxidant where it exchanges heat with flows of cold oxidant $11_A$, $11_B$, $11_C$, $11_D$. The resultant flows of hot oxidant $13_A$, $13_B$, $13_C$, $13_D$ are directed to burners $23_A$, $23_B$, $23_C$, $23_D$. The hot shell-side fluid is cooled at heat exchanger 9 and is directed to a heat exchanger 17 for preheating fuel where it exchanges heat with flows of cold fuel $19_A$, $19_B$, $19_C$, $19_D$. The resultant flows of hot fuel $21_A$, $21_B$, $21_C$, $21_D$ are directed to the burners $23_A$, $23_B$, $23_C$, $23_D$ where the hot fuel combusts with the hot oxidant to produce the hot combustion gases 1. Optionally, the shell-side fluid 3 (before heating at the recuperator or regenerator 5) may be the cooled shell-side fluid after heat exchanger at the heat exchanger 17.

While FIGS. 8-10 illustrate one heat exchanger for every four streams of oxidant $11_A$, $11_B$, $11_C$, $11_D$ and one heat exchanger for every four streams of fuel $19_A$, $19_B$, $19_C$, $19_D$, the invention is not limited in such a manner. Rather, each heat exchanger may handle as few as two or three oxidant streams $11_A$, $11_B$, $11_C$, $11_D$ or fuel streams $19_A$, $19_B$, $19_C$, $19_D$ or it may handle more than four. Also, while FIGS. 4-6 illustrate only four burners, there may be as few as two or three or as many as several dozen. In the case of a glass melting furnace, typically all of the burners (utilizing pre-heated oxidant and/or fuel) on one side of a furnace receive pre-heated oxidant and pre-heated fuel from a pair of heat exchangers (one of oxidant and one for fuel) while all of the burners on the opposite side receive pre-heated oxidant and pre-heated fuel from a different pair of heat exchangers (again, one for oxidant and one for fuel). Also, while FIG. 10 illustrates pre-heating of the oxidant before the shell-side fluid 3 is used to pre-heat the fuel, this order may be reversed.

When the control scheme illustrated in FIG. 2 is applied to the furnace of FIG. 8, the first control valve ($CV_1$) receives the first feed flow ($FF_1$) of cool reactant from the source of oxidant ($11_A$). The second control valve ($CV_2$) receives the second feed flow ($FF_1$) of cool reactant from the source of oxidant ($11_B$). The hot shell-side fluid is air received from the outlet (6) of the recuperator or regenerator (5). The first and second combined flows ($CF_1$, $CF_2$) are combusted with the gaseous fuel at the first and second burners ($23_A$, $23_B$), respectively for producing heat to heat the charge or molten glass. It will be understood that the other flows of oxidant ($11_C$, $11_D$) may be similarly preheated at the heat exchanger.

When the control scheme illustrated in FIG. 2 is applied to the furnace of FIG. 9, the first control valve ($CV_1$) receives the first feed flow ($FF_1$) of cool reactant from the source of gaseous fuel ($19_A$. The second control valve receives the second feed flow of cool reactant from the source of gaseous fuel ($19_B$). The hot shell-side fluid is air received from the outlet (6) of the recuperator or regenerator (5). The first and second combined flows ($CF_1$, $CF_2$) are combusted with the oxidant at the first and second burners ($23_A$, $23_B$), respectively for producing heat to heat the charge or molten glass. It will be understood that the other flows of fuel ($19_C$, $19_D$) may be similarly preheated at the heat exchanger.

When the control scheme illustrated in FIG. 2 is applied to the furnace of FIG. 10, the first control valve ($CV_1$) of the first of the two heat exchange systems receives the first feed flow ($FF_1$) of cool reactant from the source of oxidant (114. The second control valve ($CV_2$) of the first of the two heat exchange systems receives the second feed flow ($FF_2$) of cool reactant from the source of oxidant ($11_B$). The first control valve ($CV_1$) of the second of the two heat exchange systems receives the first feed flow ($FF_1$) of cool reactant from the source of gaseous fuel ($19_A$). The second control valve ($CV_2$) of the second of the two heat exchange systems receives the second feed flow ($FF_2$) of cool reactant from the source of gaseous fuel ($19_B$). The hot shell-side fluid is air received from the outlet (6) of the recuperator or regenerator (5). The first combined flow ($CF_1$) from the first of the two heat exchange systems and the first combined flow ($CF_1$) from the second of the two heat exchange systems are combusted at the first burner ($23_A$ for producing heat to heat the charge or molten glass. The second combined flow ($CF_2$) from the first of the two heat exchange systems and the second combined flow ($CF_2$) from the second of the two heat exchange systems are combusted at the second burner ($23_B$) for producing heat to heat the charge or molten glass. It will be understood that the other flows of fuel ($19_C$, $19_B$) and oxidant ($11_C$, $11_B$) may be similarly preheated at the heat exchangers.

The burner may be any burner suitable for the combustion of a fuel with an oxidant, in particular those suitable for use in a melting furnace such as a metal or glass furnace, for example, those disclosed by U.S. Pat. No. 6,910,879, US 2007-0172781, and US 2007-0281254.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for reducing overheating of internal components of a counter-flow shell and tube heat exchanger utilizing variable partial bypass of a reactant flow, said method comprising the steps of:
    dividing a first feed flow of a cool reactant with a first control valve between a first main flow of the cool reactant and a first bypass flow of the cool reactant, the first main flow flowing through a counter-flow shell and tube heat exchanger on a tube-side of the heat exchanger;
    exchanging heat at the shell and tube heat exchanger between the first main flow and a flow of a hot shell-side fluid and combining the first main flow with the first bypass flow to produce a first combined flow of heated reactant and also a flow of cooled shell-side fluid, the first combined flow being heated inside the shell and tube heat exchanger through heat exchange with the hot shell-side fluid and exiting the heat exchanger at a first reactant outlet of the heat exchanger and being received into a first outlet conduit fluidly communicating with the first reactant outlet;
    measuring a temperature of the first combined flow at or downstream of the first reactant outlet with a first temperature sensor that is disposed in the outlet conduit; and
    controlling relative proportions of the first main flow and first bypass flow with a first programmable logic controller and the first control valve based upon the measured temperature of the first combined flow, wherein less heat is transferred from the shell-side fluid to the first bypass flow than is transferred from the shell-side fluid to the first main flow;
    dividing a second feed flow of a cool reactant with a second control valve between a second main flow of the cool reactant and a second bypass flow of the cool reactant, the second main flow flowing through a shell and tube heat exchanger on the tube-side;
    exchanging heat at the shell and tube heat exchanger between the second main flow and a flow of a hot shell-side fluid and combining the second main flow with the second bypass flow to produce a second combined flow of heated reactant and the flow of cooled shell-side fluid, the second combined flow being heated inside the shell and tube heat exchanger through heat exchange with the hot shell-side fluid and exiting the heat exchanger at a second reactant outlet of the heat exchanger;
    measuring a temperature of the second combined flow at or downstream of the second reactant outlet;
    controlling relative proportions of the second main flow and second bypass flow with the second control valve, the second control valve being controlled by either the second programmable logic controller or the first logic controller based upon the measured temperature of the second combined flow, wherein:
        less heat is transferred from the shell-side fluid to the second bypass flow than is transferred from the shell-side fluid to the second main flow; and
        control of the relative proportions of the first feed flow into the first main and bypass flows is independent of control of the relative proportions of the second feed flow into the second main and bypass flows; and
    directing the first combined flow exiting the first and second reactant outlets to first and second burners operatively associated with a furnace, wherein:
        the shell-side fluid is air that is heated through heat exchanger with hot combustion gases at a recuperator or regenerator;
        the first and second reactants are the same and are selected from the group consisting of industrially pure oxygen, oxygen-enriched air, and natural gas;
        if the first and second reactants are industrially pure oxygen or oxygen-enriched air, the first and second reactants of the first and second combined flows are combusted with fuel at the first and second burners;
        if the first and second reactants are natural gas, the first and second reactants of the first and second combined flows are combusted with an oxidant at the first and second burners; and
        the furnace is a glass melting furnace.

2. The method of claim 1, wherein the reactant is an oxidant having an oxygen concentration higher than that of air.

3. The method of claim 2, wherein the reactant is industrially pure oxygen.

4. The method of claim 2, wherein the reactant is oxygen-enriched air.

5. The method of claim 1, wherein the reactant is a gaseous fuel.

6. The method of claim 1, wherein the shell-side fluid is air or an inert gas.

7. The method of claim 1, wherein the heat exchanger includes:
- first, second and third plenums, the third plenum receiving the first combined flow and fluidly communicating with the first reactant outlet;
- at least one first upstream reactant tube receiving the first main flow and extending through an interior of the shell from the first plenum and fluidly communicating with the second plenum;
- a first bypass tube receiving the first bypass flow and extending between the first control valve and the second plenum and extending at least partially outside the shell of the heat exchanger, wherein the first main flow and the first bypass flow are combined at the second plenum; and
- at least one first downstream reactant tube receiving the first combined flow and extending between the second and third plenums.

8. The method of claim 1, wherein the shell and tube heat exchanger includes:
- first, second and third plenums, the third plenum receiving the first combined flow and fluidly communicating with the first reactant outlet;
- at least one first upstream reactant tube receiving the first main flow and extending through an interior of the shell from the first plenum and fluidly communicating with the second plenum;
- a first bypass tube receiving the first bypass flow and extending between the first control valve and the second plenum and extending at least partially outside the shell of the heat exchanger, wherein the first main flow and the first bypass flow are combined at the second plenum;
- at least one first downstream reactant tube receiving the first combined flow and extending between the second and third plenums;
- fourth, fifth and sixth plenums, the fourth plenum receiving the second combined flow and fluidly communicating with the second reactant outlet;
- at least one second upstream reactant tube receiving the second main flow and extending inside the shell from the fourth plenum and fluidly communicating with the fifth plenum;
- a second bypass tube receiving the second bypass flow and extending between the second control valve and the fifth plenum and extending at least partially outside the shell of the heat exchanger, wherein the second main flow and the second bypass flow are combined at the fifth plenum;
- at least one second downstream reactant tube receiving the second combined flow and extending between the fifth and sixth plenums.

9. The method of claim 1, wherein the hot shell-side fluid is obtained from a recuperator or regenerator.

10. The method of claim 9, wherein the cooled shell-side fluid is directed to a recuperator or regenerator to heat the cooled shell-side fluid in order to produce the hot shell-side fluid.

* * * * *